US011888996B1

(12) United States Patent
Simkhada et al.

(10) Patent No.: US 11,888,996 B1
(45) Date of Patent: *Jan. 30, 2024

(54) SYSTEMS FOR PROVISIONING DEVICES

(71) Applicant: Amazon Technologies, Inc., Seattle, WA (US)

(72) Inventors: Umesh Simkhada, Kirkland, WA (US); Brandon Whitehead, Kirkland, WA (US); Parthik Pradipkumar Teli, Sammamish, WA (US); Thomas Gregory Hinman, Seattle, WA (US); David Isbister, San Franciso, CA (US); Alejandro Steckler, Bellevue, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/094,097

(22) Filed: Jan. 6, 2023

Related U.S. Application Data

(63) Continuation of application No. 16/135,845, filed on Sep. 19, 2018, now Pat. No. 11,552,803.

(51) Int. Cl.
*H04L 9/32* (2006.01)
*H04L 9/08* (2006.01)
*H04L 41/0806* (2022.01)
*G06F 21/73* (2013.01)
*H04L 9/00* (2022.01)

(52) U.S. Cl.
CPC ............ *H04L 9/3265* (2013.01); *G06F 21/73* (2013.01); *H04L 9/0894* (2013.01); *H04L 41/0806* (2013.01); *H04L 9/3247* (2013.01); *H04L 9/50* (2022.05)

(58) Field of Classification Search
CPC ... H04L 9/0894; H04L 9/3247; H04L 9/3263; H04L 9/3265; H04L 9/3268; H04L 9/50; H04L 41/0806; G06F 21/73
See application file for complete search history.

(56) References Cited

U.S. PATENT DOCUMENTS

| 6,463,534 | B1 | 10/2002 | Geiger et al. |
| 2004/0210772 | A1 | 10/2004 | Hooker et al. |
| 2005/0015430 | A1 | 1/2005 | Rothman et al. |

(Continued)

OTHER PUBLICATIONS

Office Action for U.S. Appl. No. 16/135,845, dated Apr. 2, 2021, Simkhada, "Systems for Provisioning Devices", 39 Pages.

(Continued)

*Primary Examiner* — Minh Dinh
(74) *Attorney, Agent, or Firm* — Lee & Hayes, P.C.

(57) ABSTRACT

This disclosure describes, in part, techniques for provisioning components. For instance, a component may be initially provisioned by a first system. To initially provision the component, the component may receive first data representing a uniform device type, a device identifier, a serial number, and/or a first certificate chain. The component may then store the first data in memory. Additionally, the component may be provisioned using a second system. To provision the component, the component may receive second data representing a product device type, a code, and a second certification chain. The second data received during the second provisioning may be associated with one more capabilities of a device. The component may then store the second data in the memory.

20 Claims, 15 Drawing Sheets

(56) References Cited

U.S. PATENT DOCUMENTS

| | | |
|---|---|---|
| 2006/0143442 A1 | 6/2006 | Smith |
| 2012/0166796 A1 | 6/2012 | Metke et al. |
| 2013/0086377 A1 | 4/2013 | Cilfone et al. |
| 2018/0060608 A1 | 3/2018 | Holden |
| 2018/0330727 A1 | 11/2018 | Tulli |
| 2019/0238342 A1 | 8/2019 | Lian et al. |

OTHER PUBLICATIONS

Office Action for U.S. Appl. No. 16/135,845, dated May 20, 2022, Simkhada, "Systems for Provisioning Devices", 6 pages.
Office Action for U.S. Appl. No. 16/135,845, dated Sep. 21, 2021, Simkhada, "Systems for Provisioning Devices", 47 pages.

US 11,888,996 B1

SYSTEMS FOR PROVISIONING DEVICES

PRIORITY

This patent application is a continuation of and claims priority to U.S. patent application Ser. No. 16/135,845, filed on Sep. 19, 2018, which will issue as U.S. Pat. No. 11,552,803 on Jan. 10, 2023, and is fully incorporated by reference herein in its entirety.

BACKGROUND

As the processing power available to devices continues to increase, it has become practical to interact with users in new ways. For example, smart-home devices may include capabilities that users can activate through voice commands or applications executing on mobile devices. In order for these smart-home devices to operate, the smart-home devices may include network components that communicate via a network with other devices. These other devices may be proximate to the smart-home devices, such as within the same environment as the smart-home devices, or these other devices may be remote from the smart-home devices.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
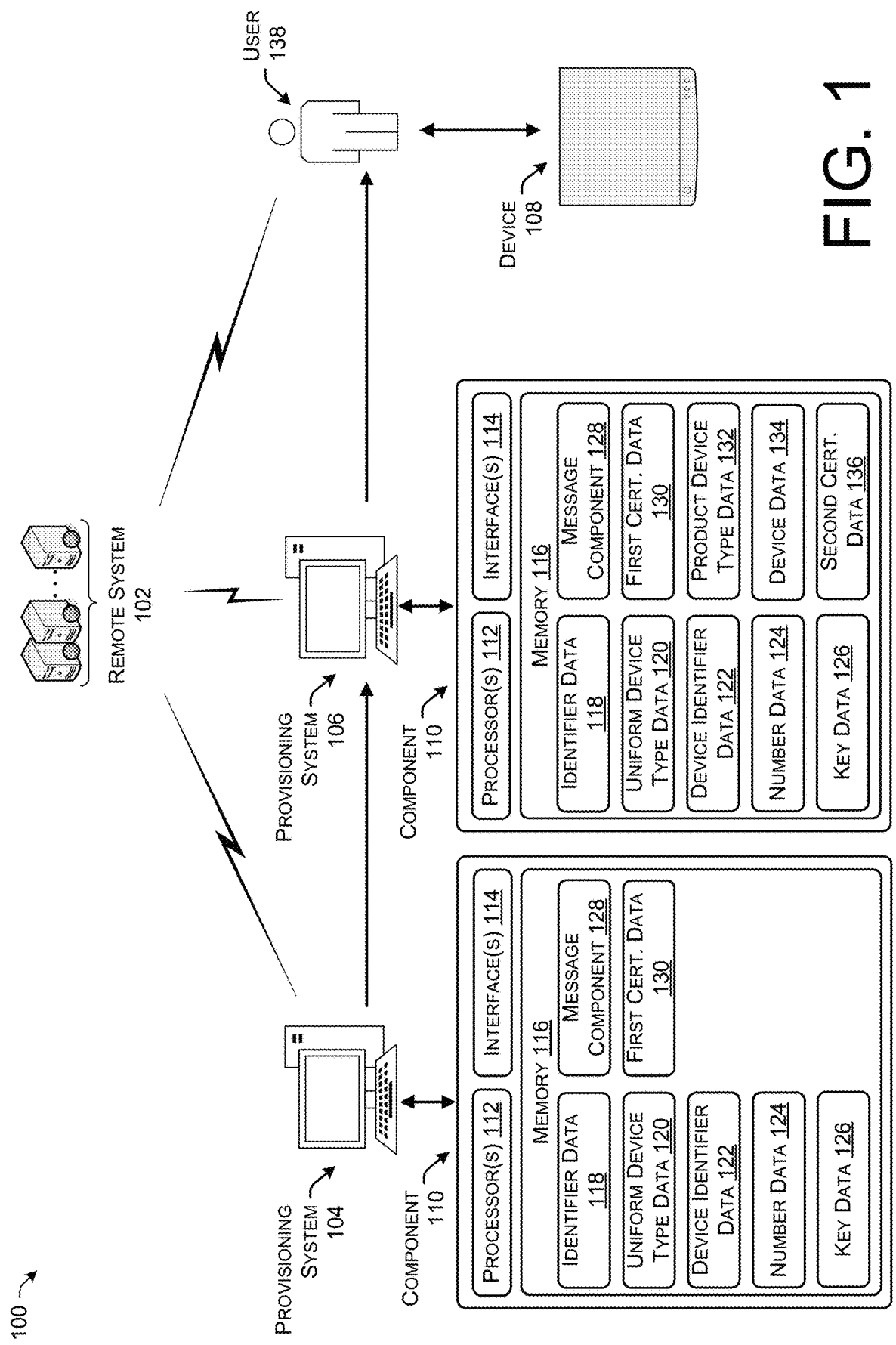
FIG. 1 is a schematic diagram of an example system for provisioning devices.

This disclosure describes, in part, techniques for provisioning devices. For instance, a component manufacturer may create components that are capable of communicating with a remote system over a network. The component manufacturer may then send the components to one or more device manufacturers, which install the components into various devices. A device may include, but is not limited to, a voice-enabled device, an Internet of Thing (IoT) device, an appliance (e.g., a microwave, a refrigerator, a dishwasher, an oven, etc.), a television, a toy, a game, an object, and/or any other type of product which a component may be installed. After creating the devices, the one or more device manufacturers may provide the devices to businesses, companies, online marketplaces, users, and/or so forth.

In some examples, one or more of the devices may include different capabilities from one or more other devices. For example, a microwave may include at least a first capability associated with setting a timer, a second capability associated with cooking, and a third capability associated with functioning as a local hub device for other IoT devices. Additionally, a television may include at least a first capability associated with providing content, a second capability associated with communicating with a user, and a third capability associated with functioning as a local hub device for other IoT devices. Furthermore, an oven may include at least a first capability associated with a timer and a second capability associated with cooking. While these are just a few examples of capabilities for devices, in other examples, devices may include any number of capabilities.

In some examples, in order for a device to operate with the intended capabilities, the component located within the device may be provisioned with software that is associated with the type of device and/or the capabilities of the device. As such, and since the component manufacturer may create components that a device manufacturer utilizes for different types of devices, the component manufacturer may provision the components to include uniform software which is not associated with a device and/or is not associated with capabilities of a device. The device manufacturer may then provision the components to include software that is associated with the devices and/or the capabilities of the devices for which the components are installed.

For instance, to initially provision a component, the component manufacturer may utilize a first provisioning system to receive data from a remote system. The data may include, but is not limited to, data representing identifier(s) associated with network connection(s) (e.g., media access control (MAC) address(es), etc.) of the component, data representing a device type (referred to, in this example, as a "first device type"), data representing an attestation key (referred to, in this example, as a "first attestation key"), data representing private key (referred to, in this example, as a "first private key"), and/or the like. The first provisioning system may then send at least a portion of the data to the component for storage in memory of the component. For example, the first provisioning system may send the data representing the identifier(s) associated with the network interface(s) and the data representing the first device type to the component for storage in the memory.

In some examples, the first provisioning system may further generate data representing a device identifier and/or data representing a serial number. The first provisioning system may then send the data representing the device identifier and/or the data representing the serial number to the component for storage in the memory. As such, in such examples, the component may store, in the memory, the data representing the identifier(s) associated with the network interface(s), the data representing the first device type, the data representing the device identifier, and/or the data representing the serial number.

In some examples, the component may then generate data representing a public/private key pair that is associated with the component (e.g., unique to the component). The component may store the data representing the public/private key pair within the memory. Additionally, the component may utilize at least a portion of the data stored in the memory to generate a message (e.g., a certificate signing request) (referred to, in this example, as a "first message"). For example, the first message may contain the generated public key. The first message may further include the serial number, the first device type, and/or the device identifier. After generating the first message, the component may send data representing the first message to the first provisioning system. The first provisioning system may then utilize the first message to generate a certificate chain (referred to, in this example, as a "first certificate chain") for the component.

For example, the first provisioning system may sign the first message using the first private key and the first attestation key. The first provisioning system may then generate the first certificate chain using the first signed message. For instance, the first certificate chain may include, but is not limited to, the signed first message, the first attestation key, a first product certificate, a first manufacturer certificate, and/or a root certificate. The first provisioning system may then send data representing the first certificate chain to the component for storage in the memory. In some examples, the first provisioning system may then cause the component to reboot (e.g., restart) in order to remove data from the volatile memory of the component. Additionally, in some examples, the first provisioning system may cause the component to verify the public/private key pair by encrypting an additional message using the private key, decrypting the encrypted message using the public key, and then verifying that the decrypted message is similar to (e.g., the same as) to the original message.

In some examples, after rebooting, the component may send the data representing the first certificate chain to the first provisioning system for verification. For example, the first provisioning system may verify that the signed first message includes the serial number, the first device type, and/or the device identifier. Additionally, the first provisioning system may generate data representing a control log, where the control log includes at least a portion of the first certificate chain. For example, the control log may include at least the signed first message. The first provisioning system may then send the data representing the control log to the remote system. Furthermore, in some examples, the first provisioning system may secure the data stored on the component.

The first provisioning system may perform similar processes to initially provision one or more additional components. In some examples, to initially provision the one or more additional components, the first provisioning system may use at least a portion of the data that was used to provision the component above. For example, the first provisioning system may use at least the data representing the first device type, the data representing the first private key, and the data representing the first attestation key. By using at least a portion of the same data to provision the other components, such as the data representing the first device type, the components may be "uniform". For example, after the initial provisioning, the components may not store data that is associated with devices and/or capabilities of devices. Rather, and as described below, the device manufacturer is able to provision the components for different devices.

For instance, to provision a component for a device, the device manufacturer may utilize a second provisioning system to send data to the remote system. The data may include, but is not limited to, data representing a model number of a device, data representing a name of the device, and/or data representing one or more capabilities of the device. The second provisioning system may then receive data from the remote system. The data may include, but is not limited to, data representing a device type (referred to, in this example, as a "second device type"), data representing a code (e.g., advertised product identifier), data representing an attestation key (referred to, in this example, as a "second attestation key"), and/or data representing a private key (referred to, in this example, as a "second private key"). In some examples, at least a portion of the data received from the remote system may be associated with at least a portion of the data that was sent to the remote system. For example, the data representing the second device type may be generated by the remote system based on the data representing the model number of the device, the data representing the name of the device, and/or the data representing the one or more capabilities of the device.

The second provisioning system may then send the data representing the second device type to the component for storage in the memory. Additionally, the second provisioning system may cause the component to verify the first certificate chain. In some examples, the component verifies the first certificate chain by verifying that the signed first message includes the serial number, the first device type, and the device identifier.

After verifying the first certificate chain, the component may utilize at least a portion of the data stored in the memory to generate another message (e.g., another certificate signing request) (referred to, in this example, as a "second message"). For example, the second message may contain the generated public key. The second message may further include the serial number, the second device type, and/or the device identifier. After generating the second message, the component may send data representing the second message to the second provisioning system. The second provisioning system may then utilize the second message to generate a certificate chain (referred to, in this example, as a "second certificate chain") for the component.

For example, the second provisioning system may sign the second message using the second private key and the second attestation key. The second provisioning system may then generate the second certificate chain using the signed second message. For instance, in some examples, the second certificate chain may include, but is not limited to, the signed second message and the second attestation key. In some examples, the second certificate chain may further include a second product certificate, a second manufacturer certificate, and/or the root certificate. The second provisioning system may then send data representing the second certificate chain to the component for storage in the memory.

In some examples, the second provisioning system may then cause the component to reboot (e.g., restart) in order to remove data from the volatile memory of the component. Additionally, in some examples, the second provisioning system may cause the component to verify the public/private key pair by encrypting an additional message using the private key, decrypting the encrypted message using the public key, and then verifying that the decrypted message is similar to (e.g., the same as) to the original message.

Furthermore, in some examples, such as after rebooting, the component may send the data representing the second certificate chain to the second provisioning system for verification. For example, the second provisioning system may verify that the signed second message includes the serial number, the second device type, and/or the device identifier. Moreover, in some examples, the second provisioning system may secure the data stored on the component.

In some examples, the second provisioning system may generate additional identifier(s) (e.g., barcode(s)) using the public key, the serial number, and/or the code associated with the component. The device manufacturer may then install the component in the device. Additionally, in some examples, the device manufacturer may place the additional identifier(s) on the device, within a package that includes the device, and/or outside of the package that includes the device. In some examples, the device manufacturer may then send the device to a user. Additionally, or alternatively, in some examples, the device manufacturer may send the device to a business, a company, an online marketplace, and/or the like that offers the device to users.

The second provisioning system may perform similar processes to provision one or more additional components, install the one or more additional components within devices, and/or send the one or more devices to users. In some examples, the second provisioning system may use different data to provision various components, where the data is associated with the types of devices being manufactured by the device manufacturer. For example, the second provisioning system may use data representing a first type of device (e.g., a microwave) to provision a first component and data representing a second type of device (e.g., a refrigerator) to provision a second component. By using different data, such as the data representing the device types, one or more of the components may no longer be "uniform". For example, after the provisioning, the components may be configured according to the capabilities of the devices for which the components are installed.

As described herein, a key may include information (e.g., a random string of bits) that determines a functional output of a cryptographic algorithm. In some examples, such as for an encryption algorithm, a key may be utilized to transform plaintext into ciphertext. In some examples, such as for a decryption algorithm, a key may be utilized to transform ciphertext into plaintext. Still, in some examples, a key may be utilized for digitally singing data. Additionally, in some examples, a public key and private key pair may be utilized to encrypt and decrypt data. For example, one of the keys may be utilized to encrypt the data and the other key may be utilized to decrypt the data.

Additionally, a certificate chain (e.g., a tree structure of certificates) may include an ordered list of certificates (e.g., public key certificates). In some examples, the ordered list of certificates may include an end-entity certificate, one or more certificate authority certificates (e.g., one or more intermediate certificates), and a root certificate. For example, the end-entity certificate may be signed by a first certificate authority certificate, which may be signed by a second certificate authority certificate, which may be signed by a third certificate authority certificate, which may be signed by a root certificate. A certificate may include information about a key, information about an identity of an owner of the certificate, and a digital signature from an entity that has verified the certificate. In some examples, a certificate may be defined by X.509.

In some examples, the root certificate may identify a root certificate authority. For example, the root certificate may identify the first provisioning system, the second provisioning system, and/or the remote system. The root certificate may be self-signed and form the basis of the certificate chain. In a certificate chain, the root certificate may be the "top-most" certificate, and the root certificate's private key may be used to "sign" one or more of the other certificates.

Furthermore, a certificate signing request may include a message that is sent from a first entity to a second entity in order to apply for a digital identity certificate. In some examples, the first entity may include a component and the second entity may include a provisioning system. In some examples, a certificate signing request includes a public key for which the certificate should be issued, additional information, and/or a digital signature. In some examples, the first entity generates a public key and private key pair. The first entity may then sign the certificate signing request using the private key.

FIG. 1 is a schematic diagram of an example system 100 for provisioning devices. The system 100 may include, for example, a remote system 102, a first provisioning system 104, a second provisioning system 106, and a device 108. In some examples, the first provisioning system 104 may be associated with a first manufacturer, such as a component manufacturer, and the second provisioning system 106 may be associated with a second manufacturer, such as a device manufacturer. In other examples, the first provisioning system 104 and the second provisioning system 106 may be associated with a single manufacturer. Still, in other examples, the first provisioning system 104 and the second provisioning system 106 may be associated with more than two manufacturers.

The system 100 may be utilized to generate a component 110 that is installed within the device 108. Even though the device 108 is illustrated as a dishwasher in the example of FIG. 1, in other example, a device may include a voice-enabled device, an IoT device, a different appliance (e.g., a microwave, a refrigerator, an oven, etc.), a television, a toy, a game, an object, and/or any other type of product which the component 110 may be installed. As shown, the component 110 includes processor(s) 112, network interface(s) 114, and memory 116. In some examples, the manufacturer associated with the first provisioning system 104 manufactures the component 110. Additionally, in some examples, and as illustrated in the example of FIG. 1, the first provisioning system 104 initially provisions the component 110 with software.

For instance, to initially provision the component 110, the first provisioning system 104 may receive data from the remote system 102. In some examples, the first provisioning system 104 may receive at least a portion of the data when provisioning the component 110. Additionally, or alternatively, in some examples, the first provisioning system 104 may receive at least a portion of the data before the actual initial provisioning occurs. The data may include, but is not limited to, identifier data 118 representing identifier(s) associated with network connection(s) (e.g., MAC address(es), etc.), uniform device type data 120 representing a uniform device type, data representing an attestation key (referred to, in this example, as a "first attestation key"), data representing private key (referred to, in this example, as a "first private key"), and/or the like. In some examples, the identifier(s) associated with the network interface(s) 114 may include a first identifier associated with a first network interface 114 (e.g., a first MAC address associated with WiFi connection), a second identifier associated with a second network interface 114 (e.g., a MAC address associated with BLUETOOTH® connection), and/or the like. The uniform device type may include, but is not limited to, a type of component being provisioned, a numerical identifier, an alphabetic identifier, a mixed numerical and alphabetic number, and/or any other type of identifier that can be used to identify the type of device associated with the component 110.

In some examples, the first provisioning system 104 may further generate device identifier data 122 representing a device identifier and/or number data 124 representing a number associated with the component 110. The device identifier may include, but is not limited to, a name of the component 110, a numerical identifier, an alphabetic identifier, a mixed numerical and alphabetic number, and/or any other type of identifier that can be used to identify the component 110. In some examples, the first provisioning system 104 generates the device identifier using one or more of the identifier(s) associated with the network connection(s). The number associated with the component 110 may include, but is not limited to, a serial number, a numerical identifier, an alphabetic identifier, a mixed numerical and alphabetic number, and/or any other type of number that can be used to identify the component 110

The first provisioning system 104 may then send at least a portion of the data to the component 110 for storage in the memory 116 of the component 110. For example, the first provisioning system 104 may send the identifier data 118 and the uniform device type data 120 to the component 110 for storage in the memory 116. Additionally, the first provisioning system 104 may send the device identifier data 122 and/or the number data 124 to the component 110 for storage in the memory 116. As such, and as illustrated in the example of FIG. 1, the component 110 may store, in the memory 116, the identifier data 118 representing the identifier(s) associated with the network connection(s), the uniform device type data 120 representing the uniform device type, the device identifier data 122 representing the device identifier, and/or the number data 124 representing the serial number.

In some examples, the component 110 may then generate key data 126 representing a public/private key pair that is associated with the component 110 (e.g., unique to the component 110). The component 110 may store the key data 126 representing the public/private key pair within the memory 116. Additionally, the component 110 may utilize a message component 128 to generate a first message (e.g., a first certificate signing request) using at least a portion of the data stored in the memory 116. For example, the first message may contain the generated public key. The first message may further include the serial number, the uniform device type, and/or the device identifier. After generating the first message, the component 110 may send data representing the first message to the first provisioning system 104. The first provisioning system 104 may then utilize the first message to generate first certificate data 130 representing a first certificate chain for the component 110.

For example, the first provisioning system 104 may sign the first message using the first private key and the first attestation key. The first provisioning system 104 may then generate the first certificate chain to include the signed first message, the first attestation key, a first product certificate, a first manufacture certificate, and/or a root certificate. For example, in the first certificate chain, the first message may be signed by the first attestation key, the first attestation key may be signed by the first product certificate, the first product certificate may be signed by the first manufacturer certificate, and the first manufacturer certificate may be signed by the root certificate. The first provisioning system 104 may then send the first certificate data 130 representing the first certificate chain to the component 110 for storage in the memory 116.

In some examples, the first provisioning system 104 may then cause the component 110 to reboot (e.g., restart) in order to remove data from the volatile memory 116 of the component 110. Additionally, in some examples, the first provisioning system 104 may cause the component 110 to verify the key data 126 representing the public/private key pair stored in the memory 116. To verify the key data 126, the component 110 may encrypt a message using the private key, decrypt the encrypted message using the public key, and then verify that the decrypted message is similar to (e.g., the same as) to the original message.

In some examples, after the reboot, the component 110 may send the first certificate data 130 representing the first certificate chain to the first provisioning system 104 for verification. For example, the first provisioning system 104 may verify that the signed first message includes the serial number, the uniform device type, and the device identifier. Additionally, the first provisioning system 104 may generate data representing a control log, where the control log includes at least a portion of the first certificate chain. For example, the control log may include at least the signed first message. In some examples, the control log may further associate the first certificate chain with the serial number, the uniform device type, and/or the device identifier. The first provisioning system 104 may then send the data representing the control log to the remote system 102. Furthermore, in some examples, the first provisioning system 104 may secure the data stored on the component 110.

After initially provisioning the component 110, the second provisioning system 106 may provision the component 110 such that the component 110 is compatible with one or more capabilities of the device 108. For instance, the second provisioning system 106 may send data to the remote system 102. The data may include, but is not limited to, data representing a model number of a device 108, data representing a name of the device 108, and/or data representing one or more capabilities of the device 108. In the example of FIG. 1, the one or more capabilities of the device 108 (e.g., the dishwasher) may include, but are not limited to, a first capability associated with turning on, a second capability associated with turning off, and/or a third capability associated with setting a type of washing cycle.

The second provisioning system 106 may then receive data from the remote system 102. The data may include, but is not limited to, product device type data 132 representing a product device type, device data 134 representing a code (e.g., advertised product identifier), data representing a second attestation key, and/or data representing a second private key. The product device type may include, but is not limited to, a type of device 108, a numerical identifier, an alphabetic identifier, a mixed numerical and alphabetic number, and/or any other type of identifier that can be used to identify the type of device 108. The code may include, but is not limited to, a numerical identifier, an alphabetic identifier, a mixed numerical and alphabetic number, and/or any other type of identifier. In some examples, at least a portion of the data received from the remote system 102 may be associated with at least a portion of the data that was sent to the remote system 102. For example, the product device type data 132 representing the product device type may be generated by the remote system 102 based on the data representing the model number of the device 108, the data representing the name of the device 108, and/or the data representing the one or more capabilities of the device 108.

The second provisioning system 106 may then send the product device type data 132 and/or the device data 134 to the component 110 for storage in the memory 116. Additionally, the second provisioning system 106 may cause the component 110 to verify the first certificate chain. In some examples, the component 110 verifies the first certificate chain by verifying that the signed first message includes the serial number, the uniform device type, and the device identifier.

After verifying the first certificate chain, the message component 128 may utilize at least a portion of the data stored in the memory 116 to generate a second message. For example, the second message may contain the generated public key. The second message may further include the serial number, the product device type, and/or the device identifier. After generating the second message, the component 110 may send data representing the second message to the second provisioning system 106. The second provisioning system 106 may then utilize the second message to generate second certificate data 136 representing a second certificate chain for the component 110.

For example, the second provisioning system 106 may sign the second message using the second private key and the second attestation key. In some examples, the second certificate chain may then include, but is not limited to, the signed second message and the second attestation key. In some examples, the second certificate chain may further include a second product certificate, a second manufacturer certificate, and/or the root certificate. For example, in the second certificate chain, the second message may be signed by the second attestation key, the second attestation key may be signed by the second product certificate, the second product certificate may be signed by the second manufacturer certificate, and the second manufacturer certificate may be signed by the root certificate. In some examples, the first product certificate and/or the first manufacturer certificate may respectively be similar to (e.g., the same as) the second product certificate and/or the second manufacturer certificate. In some examples, the first product certificate and/or the first manufacturer certificate may respectively be different than the second product certificate and/or the second manufacturer certificate. The second provisioning system 106 may then send the second certificate data 136 representing the second certificate chain to the component 110 for storage in the memory 116.

In some examples, the second provisioning system 106 may then cause the component 110 to reboot (e.g., restart) in order to remove data from the volatile memory 116 of the component 110. Additionally, in some examples, the second provisioning system 106 may cause the component 110 to verify the key data 126 representing the public/private key pair by encrypting a message using the private key, decrypting the encrypted message using the public key, and then verifying that the decrypted message is similar to (e.g., the same as) to the original message. Furthermore, in some examples, the component 110 may send the second certificate data 136 representing the second certificate chain to the second provisioning system 106 for verification. For example, the second provisioning system 106 may verify that the signed second message includes the serial number, the product device type, and the device identifier. Moreover, in some examples, the second provisioning system 106 may secure the data stored on the component.

As further illustrated in the example of FIG. 1, a user 138 may receive the device 108 that includes the component 110.

In some examples, the user 138 may utilize the device 108 as part of a home system. For example, the home system may include one or more devices that are located at an environment (e.g., home, business, company, etc.) associated with the user 138. In some examples, the devices, including the device 108, may be voice-enabled devices that are configured to operate based on voice commands from the user 138. For example, the component 110 may provide the device 108 with one or more capabilities that allow the device 108 to be controlled using the voice commands. In such examples, the device 108 (e.g., the component 110) may be configured to send audio data representing the voice commands to the remote system 102 for speech processing. The remote system 102 may then send data back to the device 108 (e.g., the component 10), where the data causes the device 108 (and/or the component 110) to perform an action associated with a capability of the device 108. This is described in more detail with regard to FIGS. 10 and 11.

Figure 2:
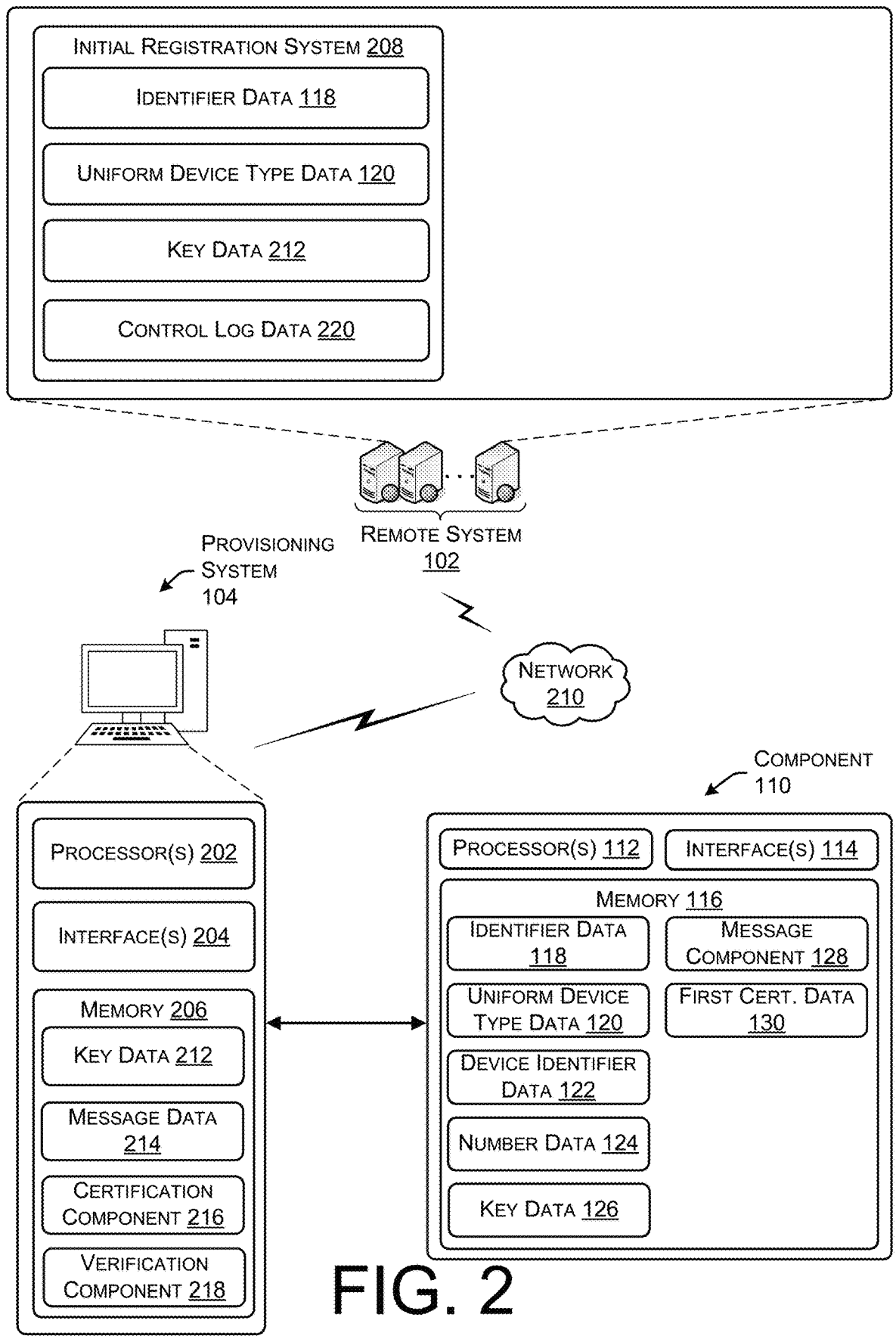
FIG. 2 is a schematic diagram of an example of initially provisioning a component.

FIG. 2 is a schematic diagram of an example of initially provisioning the component 110. As shown, the first provisioning system 104 may include at least processor(s) 202, network interface(s) 204, a memory 206.

To initially provision the component 110, the remote system 102 (e.g., an initial registration system 208 of the remote system 102) may send, over the network 210, the identifier data 118 representing the identifier(s) associated with the network connection(s) and the uniform device type data 120 representing the uniform device type to the first provisioning system 104. Additionally, in some examples, the remote system 102 may send, over the network 210, key data 212 representing the first attestation key and the first private key to the first provisioning system 104. Additionally, or alternatively, in some examples, the remote system 102 may provide the first provisioning system 104 with a hardware device (e.g., a YubiKey) that includes the key data 212 representing the first attestation key and the first private key. In such examples, the key data 212 may be stored on the hardware device, which may be separate from the memory. For example, the hardware device may be communicatively attached to the first provisioning system 104.

The first provisioning system 104 may generate the device identifier data 122 representing the device identifier and/or the number data 124 representing the number associated with the component 110. Additionally, the first provisioning system 104 may send the identifier data 118, the uniform device type data 120, the device identifier data 122, and the number data 124 to the component 110 for storage in the memory 116. Furthermore, the first provisional system 104 may receive, from the component 110, first message data 214 representing the first message generated by the component. As discussed herein, the first message may contain the public key generated by the component 110. The first message may further include the serial number, the uniform device type, and/or the device identifier.

The first provisioning system 104 may then sign the first message using the first private key and the first attestation key (which, in some examples, may be performed within the hardware device). The first provisioning system 104 may then utilize a certification component 216 to generate the first certification data 130 representing the first certificate chain. As discussed herein the first certificate chain may include the signed first message, the first attestation key, the first product certificate, the first manufacture certificate, and/or the root certificate. The first provisioning system 104 may then send the first certificate data 130 representing the first certificate chain to the component 110 for storage in the memory 116.

In some examples, such as after rebooting the component 110, the first provisioning system 104 may receive the first certificate data 130 from the component 110. The first provisioning component 104 may then utilize a verification component 218 to verify the first certification chain. In some examples, the verification component 218 may verify the first certification chain by determining that the first message includes at least the serial number, the uniform device type, and/or the device identifier.

In some examples, the first provisioning system 104 may generate control log data 220 representing a control log associated with the component 110. The control log may include, but is not limited to, one or more of the certificates included in the first certificate chain, the identifier(s) associated with the network connection(s), the uniform device type, the device identifier, and/or the number data. The first provisioning system 104 may then send, over the network 210, the control log data 220 to the remote system 102.

Figure 3:
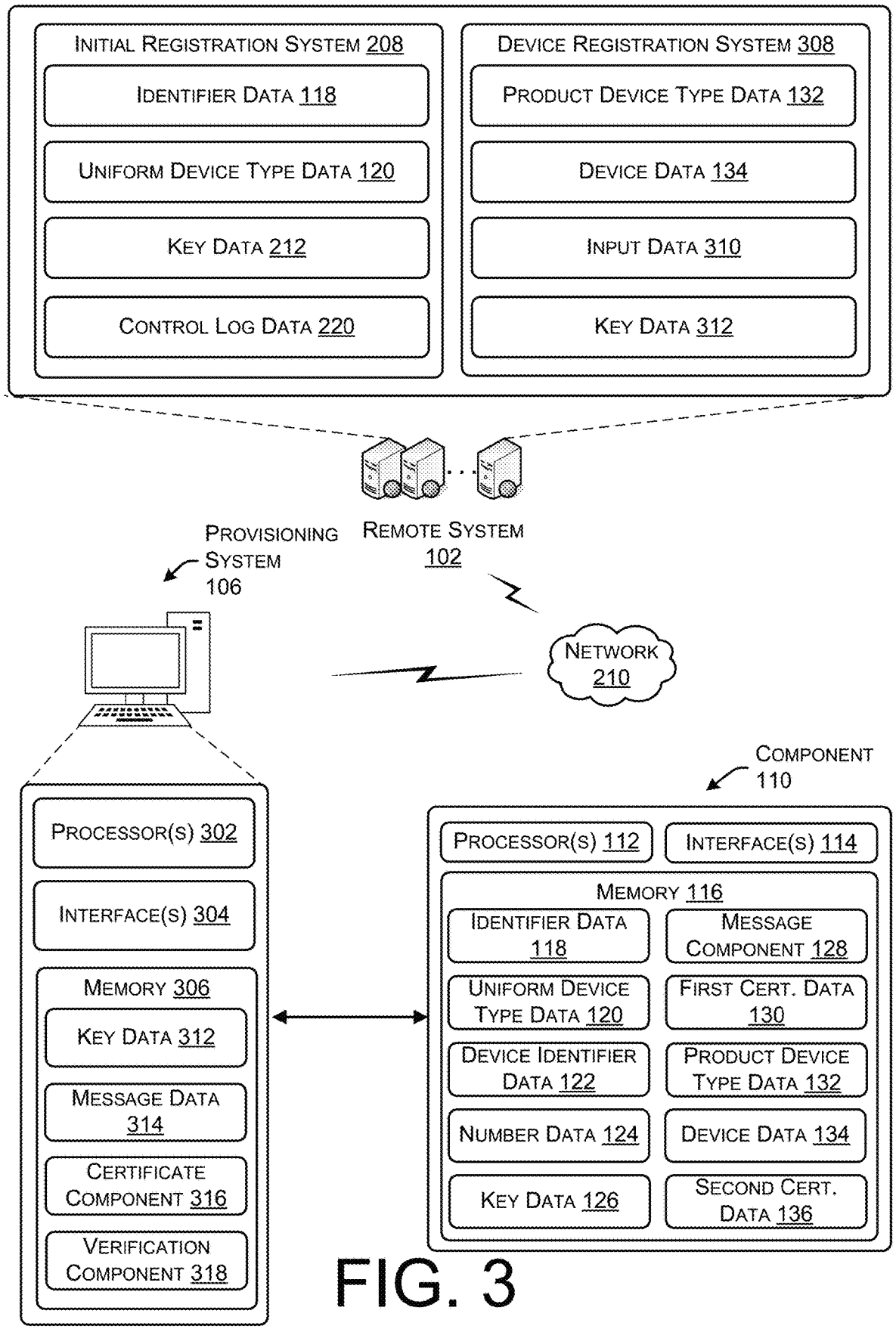
FIG. 3 is a schematic diagram of an example of provisioning a component for use in a device.

FIG. 3 is a schematic diagram of an example of provisioning the component 110 for use in the device 108. As shown, the second provisioning system 106 may include at least processor(s) 302, network interface(s) 304, a memory 306.

To provision the component 110, the remote system (e.g., a device registration system 308 of the remote system 102) may receive, over the network 210, input data 310 from the second provisioning system 106. The input data 310 may include, but is not limited to, data representing a name of the device 108, data representing a product number associated with the device 108, and/or data representing one or more capabilities of the device 108. The remote system 102 may then utilize at least a portion of the input data 310 to generate the product device type data 132 representing the product device type and the device data 134 representing the code (e.g., advertised product identifier). The second provisioning system 106 may then receive, over the network 210, the product device type data 132 and the device data 134 from the remote system, 102. Additionally, the second provisioning system 106 may send the product device type data 132 and the device data 134 to the component 110 for storage in the memory 116.

In some examples, the remote system 102 may send, over the network 210, key data 312 representing the second attestation key and the second private key to the second provisioning system 106. Additionally, or alternatively, in some examples, the remote system 102 may provide the second provisioning system 106 with a hardware device (e.g., a YubiKey) that includes the key data 312 representing the second attestation key and the second private key. In such examples, the second provisioning system 106 may be communicatively attached to the hardware device.

The second provisional system 106 may receive, from the component 110, second message data 314 representing the second message generated by the component 110. As discussed herein, the second message may contain the public key generated by the component 110. The second message may further include the serial number, the product device type, and/or the device identifier. The second provisioning system 106 may then sign the second message using the second private key and the second attestation key (which, in some examples, may be performed within the hardware device). The second provisioning system 106 may then utilize a certification component 316 to generate the second certification data 136 representing the second certificate chain. As discussed herein, the second certificate chain may include the signed second message and the second attestation key. Additionally, in some examples, the second certificate chain may include the second product certificate, the second manufacture certificate, and/or the root certificate. The second provisioning system 106 may then send the second certificate data 134 representing the second certificate chain to the component 110 for storage in the memory 116.

In some examples, such as after rebooting the component 110, the second provisioning system 106 may receive the second certificate data 136 from the component 110. The second provisioning component 106 may then utilize a verification component 318 to verify the second certification chain. In some examples, the verification component 318 may verify the second certification chain by determining that the second message includes at least the serial number, the product device type, and the device identifier.

In examples, some or each of the components and/or systems of the remote system 102 may include their own processor(s), network interface(s), and/or memory. As such, by way of example, the initial registration system 208 may include and/or be associated with processor(s), network interface(s), and/or memory. The device registration system 308 may include and/or be associated with different processor(s), network interface(s), and/or memory, or one or more of these components may utilize some or all of the same processor(s), network interface(s), and/or memory utilized by the initial registration system 208. These components are described in detail herein. Additionally, the operations and/or functionalities associated with and/or described with respect to the components of the remote system 102 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

As used herein, a processor, such as the processor(s) 112, the processor(s) 202, the processor(s) 302, and/or the processor(s) described with respect to the remote system 102 may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 112, the processor(s) 202, the processor(s) 302, and/or the processor(s) described with respect to the remote system 102 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 112, the processor(s) 202, the processor(s) 302, and/or the processor(s) described with respect to the remote system 102 may possess its own local memory, which also may store program components, program data, and/or one or more operating systems.

The memory 116, the memory 206, the memory 306, and/or the memory described with respect to the remote system 102 may include volatile and nonvolatile memory, removable and non-removable media implemented in any method or technology for storage of information, such as computer-readable instructions, data structures, program component, or other data. The memory 116, the memory 206, the memory 306, and/or the memory described with respect to the remote system 102 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 116, the memory 206, the memory 306, and/or the memory described with respect to the remote system 102 may be implemented as computer-readable storage media ("CRSM"), which may be any available physical media accessible by the processor(s) processor(s) 112, the processor(s) 202, the processor(s) 302, and/or the processor(s) described with respect to the remote system 102 to execute instructions stored on the memory 116, the memory 206, the memory 306, and/or the memory described with respect to the remote system 102. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as the memory 116, the memory 206, the memory 306, and/or the memory described with respect to the remote system 102, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 114, the network interface(s) 204, the network interface(s) 304, and/or the network interface(s) described with respect to the remote system 102 may enable messages between the remote system 102, the first provisioning system 104, the second provisioning system 106, and/or the component 110, and/or with one or more other remote systems, as well as other networked devices. The network interface(s) 114, the network interface(s) 204, the network interface(s) 304, and/or the network interface(s) described with respect to the remote system 102 may include one or more network interface controllers (NICs) or other types of transceiver devices to send and receive messages over the network 210.

For instance, each of the network interface(s) 114, the network interface(s) 204, the network interface(s) 304, and/or the network interface(s) described with respect to the remote system 102 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 114, the network interface(s) 304, the network interface(s) 304, and/or the network interface(s) described with respect to the remote system 102 may include a wide area network (WAN) component to enable message over a wide area network.

FIGS. 4-9 illustrate various processes for systems for provisioning components. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

Figure 4:
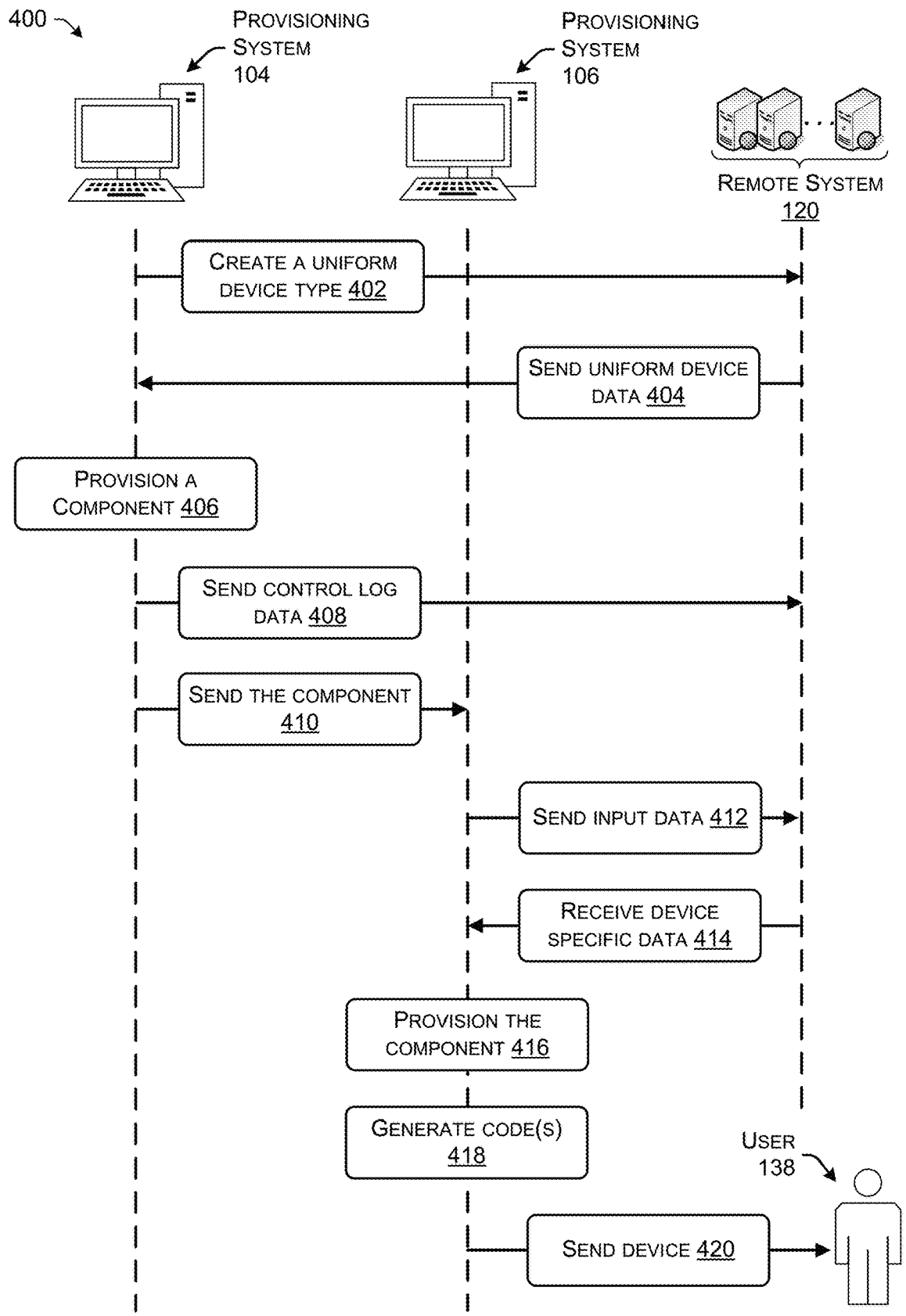
FIG. 4 illustrates an example process for initially provisioning a component using a first provisioning system and then further provisioning the component using a second provisioning system.

FIG. 4 illustrates an example process 400 for initially provisioning a component 110 using the first provisioning system 104 and then further provisioning the component 110 using the second provisioning system 106. At 402, the process 400 may include creating a uniform device type. For example, the first provisioning system 104 may send data to the remote system 102, when the data represents a request for uniform device type data representing a uniform device type for component 110s being generated and/or provisioned by the first provisioning system 104. In some examples, the data may further represent the type of component 110s being generated and/or provisioned by the first provisioning system 104.

At 404, the process 400 may include sending uniform device data. For example, the remote system 102 may send the uniform device data to the first provisioning system 104. As discussed herein, the uniform device type data may include, but is not limited to, identifier data representing identifier(s) associated with the network connection(s) (e.g., MAC address(es), etc.), uniform device type data representing a uniform device type, key data representing a first attestation key, and/or key data representing first private key. In some examples, in addition to, or alternatively from, sending the key data representing the first attestation key and the key data representing the first private key, the remote system 102 provides the first provisioning system 104 with a hardware device (e.g., a YubiKey) that includes the key data representing the first attestation key and the key data representing the first private key.

At 406, the process 400 may include provisioning a component 110. For example, the first provisioning system 104 may initially provision the component 110 using at least a portion of the uniform device data. The process for initially provisioning the component 110 is described in more detail with regard to FIGS. 5A-5B.

At 408, the process 400 may include sending control log data. For example, the first provisioning system 104 may send the control log data to the remote system 102. The control log data may represent a control log associated with the component 110. The control log may include, but is not limited to, one or more of the certificates included in a first certificate chain stored on the component 110, the identifier(s) associated with the network connection(s), the uniform device type, a device identifier associated with the component 110, a serial number associated with the component 110, and/or a public key generated by the component 110.

At 410, the process 400 may include sending the component 110. For example, the first provisioning system 104 may send the component 110 to the second provisioning system 106. As discussed herein, in some examples, the first provisioning system 104 may be associated with a component 110 manufacturer that creates and/or provisions the component 110s and the second provisioning system 106 may be associated with a device manufacturer that creates devices, provisions the component 110s for the devices, and/or installs the component 110s within the devices.

At 412, the process 400 may include sending input data. For example, the second provisioning system 106 may send the input data to the remote system 102. The input data may include, but is not limited to, data representing a name of a device, data representing a model number of the device, and/or data representing one or more capabilities of the device. The remote system 102 may then utilize at least a portion of the input data to generate product device type data representing a product device type and/or device data representing a code (e.g., advertised product identifier).

At 414, the process 400 may include receiving device specific data. For example, the remote system 102 may send the device specific data to the second provisioning system 106. The device specific data may include, but is not limited to, product device type data representing a product device type, device data representing a code (e.g., advertised product identifier), data representing a second attestation key, and/or data representing a second private key. In some examples, in addition to, or alternatively from, sending the key data representing the second attestation key and the key data representing the second private key, the remote system 102 provides the second provisioning system 106 with a hardware device (e.g., a YubiKey) that includes the key data representing the second attestation key and the key data representing the second private key.

At 416, the process 400 may include provisioning the component 110. For example, the second provisioning system 106 may provision the component 110 using at least a portion of the device specific data. The process for provisioning the component 110 is described in more detail with regard to FIGS. 6A-6B.

At 418, the process 400 may include generating code(s). For example, the second provisioning system 106 may generate the code(s) (e.g., barcode(s)) for the device. In some examples, the second provisioning system 106 generates an inner barcode and an outer barcode using the public key, the serial number, and the code (e.g., the advertised product identifier). In some examples, such as when the second provisioning system 106 is associated with the device manufacturer, the device manufacturer may package the device for delivery.

At 420, the process 400 may include sending the device. For example, the device may be sent to the user 138. In some examples, such as when the second provisioning system 106 is associated with the device manufacturer, the device manufacturer may send the device to the user 138. In other examples, the device manufacturer may send the device to a business, a company, an online marketplace, and/or the like, which then sends the device to the user 138.

Figure 5A:
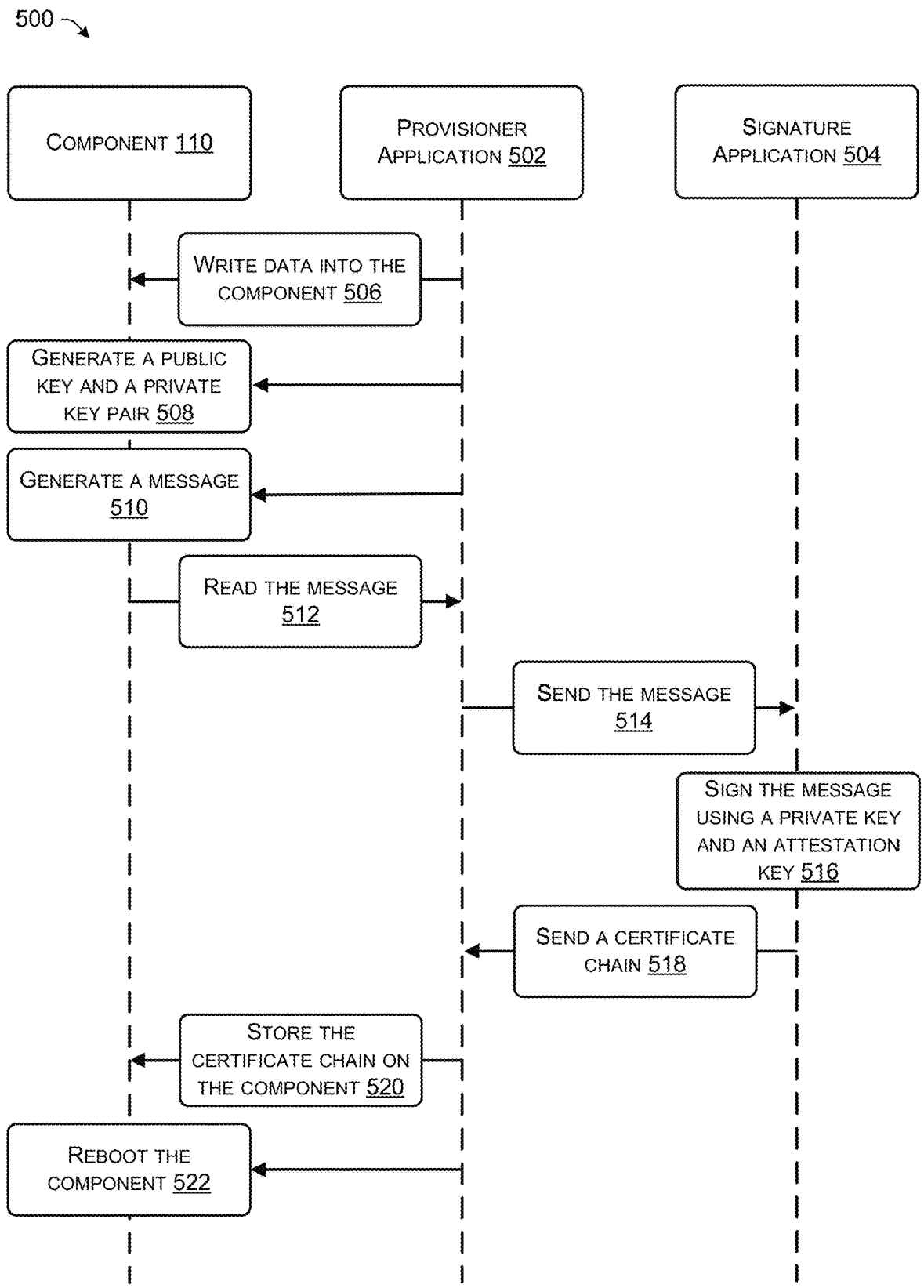
FIGS. 5A-5B illustrate an example process for initially provisioning a component using a provisioning system.
Figure 5B:
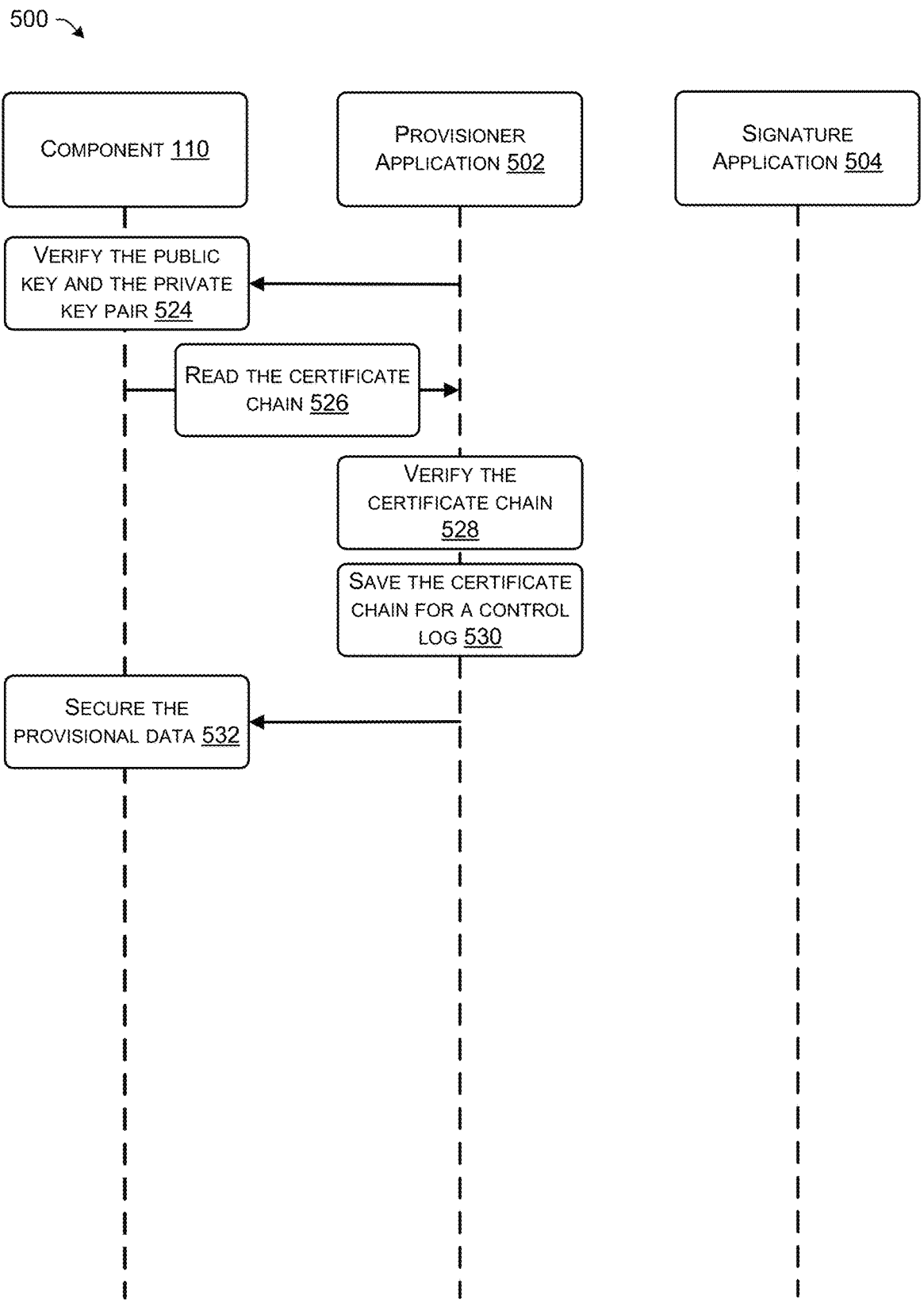

FIGS. 5A-5B illustrate an example process 500 for initially provisioning the component 100 using the first provisioning system 104. In some examples, the first provisioning system 104 may be executing a provisioner application 502 and a signature application 504. In some examples, a hardware device (e.g., a YubiKey) may be attached to the first provisioning system 104, where the hardware device is executing the signature application 504. In such examples, the hardware device includes an attestation key and a private key. In some examples, command line interfaces may be running within the component 110 and communicating with the provisioner application 502 in order to initially provision the component 110.

At 506, the process 500 may include writing data into the component. For example, the provisioner application 502 may cause the first provisioning system 104 to write the data into the component 110. The data may include, but is not limited to, the identifier data representing the identifier(s) associated with the network communication(s), the uniform device type data representing the uniform device type, the device identifier data representing the device identifier associated with the component 110, data representing a board identifier, and/or the number data representing the serial number associated with the component 110.

At 508, the process 500 may include generating a public key and a private key pair. For example, the provisioner application 502 may cause the first provisioning system 104 to send a command to the component 110 that causes the component 110 to generate key data representing the public key and private key pair for the component 110. The component 110 may then store the key data in the memory 116.

At 510, the process 500 may include generating a message. For example, the provisioner application 502 may cause the first provisioning system 104 to send a command to the component 110 that causes the component 110 to generate the message (e.g., a certificate signing request). The message may include the public key, the serial number, the uniform device type, and/or the device identifier.

At 512, the process 500 may include reading message. For example, the provisioner application 502 may cause the first provisioning system 104 to read the message from the component 110.

At 514, the process 500 may include sending the message. For example, the provisioner application 502 may cause the first provisioning system 104 to send message data representing the message to the signature application 504. As discussed above, the signature application 504 may be executing within the hardware device that is attached to the first provisioning system 104. As such, the first provisioning system 104 may send the message data representing the message to the hardware device.

At 516, the process 500 may include signing the message using a private key and an attestation key. For example, the signature application 504 may sign the message using the private key and the attestation key. In some examples, the signature application 504 signs the message within the hardware device that is attached to the first provisioning system 104.

At 518, the process 500 may include sending a certificate chain. For example, the signature application 504 may send certificate data representing the certificate chain to the provisioner application 502. The certificate chain may include, but is not limited to, the signed message, the attestation key, a product certificate, a manufacturer certificate, and a root certificate.

At 520, the process 500 may include storing the certificate chain on the component. For example, the provisioner application 502 may cause the first provisioning system 104 to store the certificate data representing the certificate chain on the component 110.

At 522, the process 500 may include rebooting the component. For example, the provisioner application 502 may cause the first provisioning system 104 to send a command to the component 110 that causes the component 110 to reboot. In some examples, during the reboot, the component 110 may further remove any data from the volatile memory of the component 110.

At 524, the process 500 may include verifying the public key and the private key pair. For example, the provisioner application 502 may cause the first provisioning system 104 to send a command to the component 110 that causes the component 110 to verify the public key and private key pair. In some examples, to perform the verification, the component 110 encrypts a message using the private key. The component 110 then decrypts the encrypted message using the public key in order to retrieve the message. If the retrieved message is similar to (e.g., the same as) the original message, then the component 110 may verify the public key and private key pair. However, if the retrieved message is not similar to (e.g., different than) the original message, then the component 110 may not verify the public key and private key pair.

At 526, the process 500 may include reading the certificate chain. For example, the provisioner application 502 may cause the first provisioning system 104 to read the certificate chain stored on the component 110.

At 528, the process 500 may include verifying the certificate chain. For example, the provisioner application 502 may cause the first provisioning system 104 to verify the certificate chain. In some examples, to verify the certificate chain, the first provisioning system 104 may verify that the message included in the certificate chain includes the serial number, the uniform device type, and/or the device identifier. In such examples, based on determining that the message includes the serial number, the uniform device type, and the device identifier, the first provisioning system 104 may verify the certificate chain. However, based on determining that the message does not include at least one of the serial number, the uniform device type, or the device identifier, the first provisioning system 104 may not verify the certificate chain.

At 530, the process 500 may include saving the certificate chain for a control log. For example, the provisioner application 502 may cause the first provisioning system 104 to save the certificate chain. The provisioner application 502 may then cause the first provisioning system 104 to generate a control log that includes the certificates from the certificate chain, the identifier(s) associated with the network connection(s), the uniform device type, the device identifier, and/or the serial number. Additionally, the provisioner application 502 may cause the first provisioning system 104 to send control log data representing the control log to the remote system 102.

At 532, the process 500 may include securing the provisional data. For example, the provisional application 502 may cause the first provisioning system 104 to send a command to the component 110 that causes the component to secure the provisional data. The provisional data may include, but is not limited to, the identifier data representing the identifier(s) associated with the network connection(s), the uniform device type data representing the uniform device type, the device identifier data representing the device identifier associated with the component 110, the data representing the board identifier, the number data representing the serial number associated with the component 110, the key data representing the public key and private key pair, and/or the certificate data representing the certificate chain.

In some examples, to secure the component 110, the component 110 may remove any necessary bits stored on the component 110. Additionally, in some examples, to secure the component 110, one or more of the command line interfaces running on the component 110 are disabled. This may include "blowing" e-fuse bits which control the one or more command line interfaces running on the component 110. In some examples, this may limit the control line interfaces that the second provisioning system 106 is able to access.

Figure 6A:
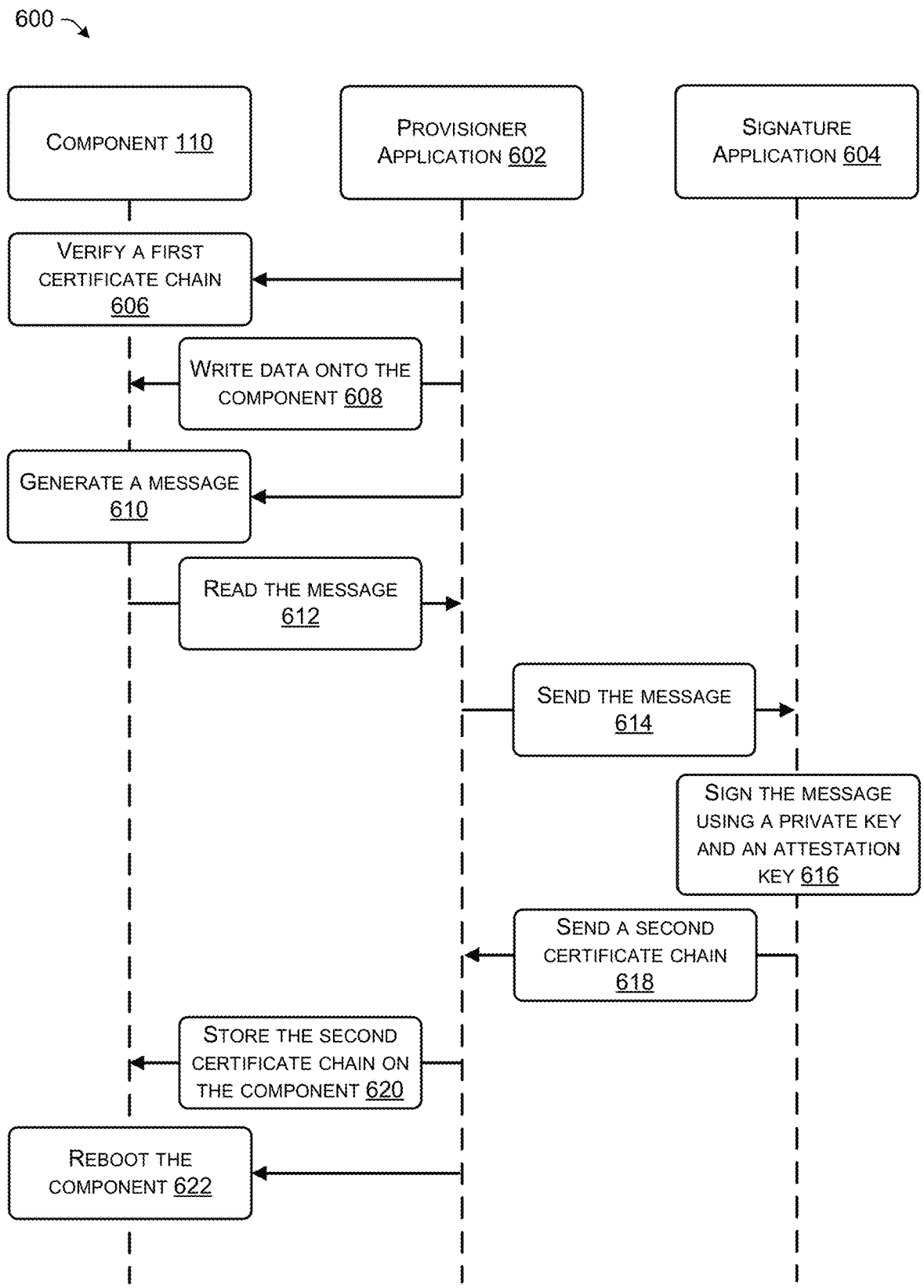
FIGS. 6A-6B illustrate an example process for provisioning a component for use in a device using a provisioning system.
Figure 6B:
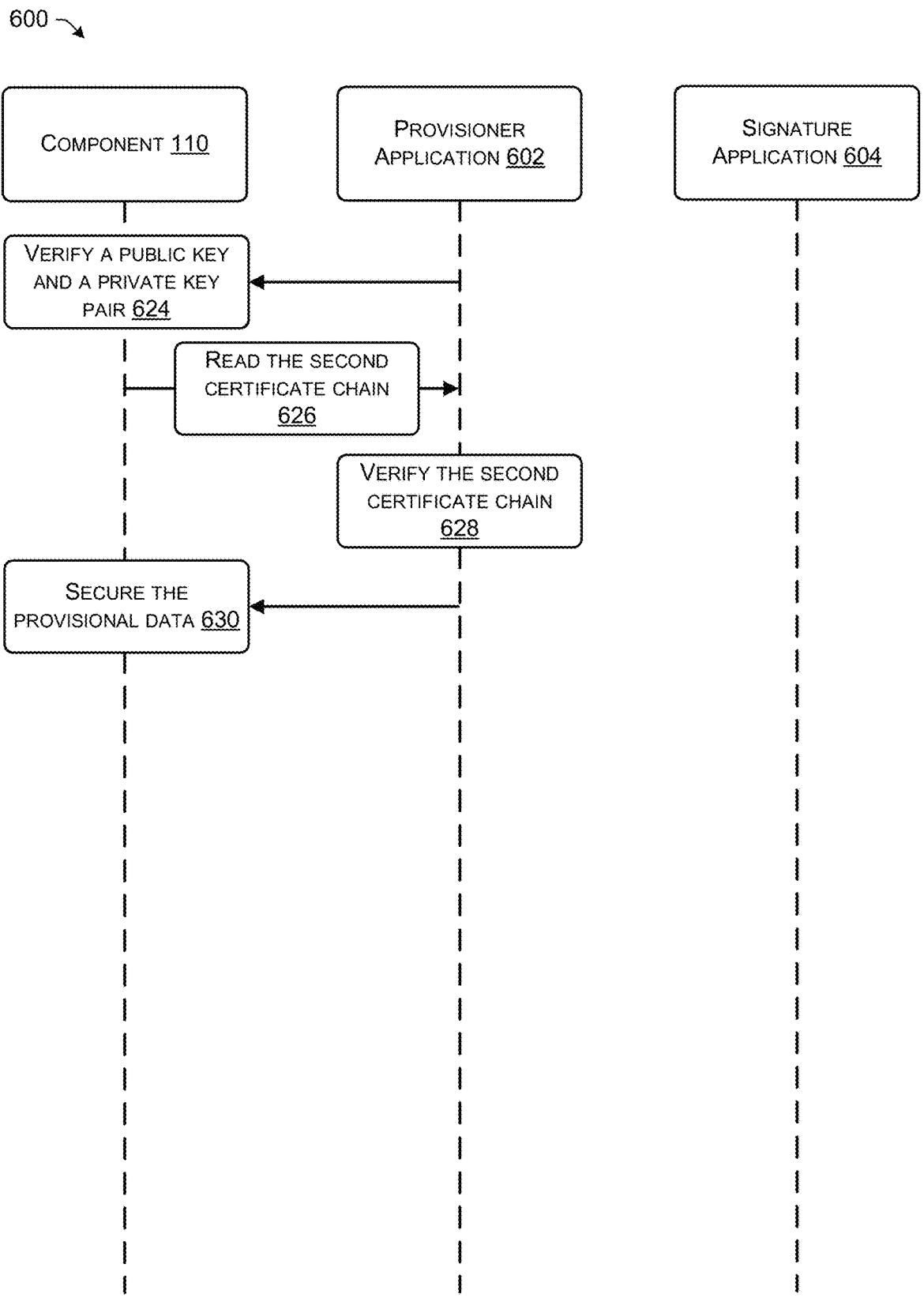

FIGS. 6A-6B illustrate an example process 600 for provisioning the component 110 for use in a device using the second provisioning system 106. In some examples, the second provisioning system 106 may be executing a provisioner application 602 and a signature application 604. In some examples, a hardware device (e.g., a YubiKey) may be attached to the second provisioning system 106, where the hardware device is executing the signature application 604. In such examples, the hardware device includes an attestation key and a private key. In some examples, command line interfaces may be running within the component 110 and communicating with the provisioner application 602 in order to provision the component 110.

At 606, the process 600 may include verifying a first certificate chain. For example, the provisioner application 602 may cause the second provisioning system 106 to send a command to the component 110 that causes the component 110 to verify the first certificate chain. The component 110 may have stored the first certificate chain within the memory 116 during an initial provisioning of the component 110 (e.g., during the example process 500 of FIGS. 5A-5B). In some examples, to verify the first certificate chain, the component 110 may verify that the message included within the first certificate chain includes the serial number, the uniform device type, and/or the device identifier. In such examples, based on determining that the message includes the serial number, the uniform device type, and the device identifier, the component 110 may verify the first certificate chain. However, based on determining that the message does not include at least one of the serial number, the uniform device type, or the device identifier, the component 110 may not verify the first certificate chain.

At 608, the process 600 may include writing data onto the component. For example, the provisioner application 602 may cause the second provisioning system 106 to write the data onto the component 110. The data may include, but is not limited to, product device type data representing a product device type and device data representing a code e.g., advertised product identifier).

At 610, the process 600 may include generating a message. For example, the provisioner application 502 may cause the second provisioning system 106 to send a command to the component 110 that causes the component 110 to generate the message. The message may include the public key, the serial number, the product device type, and/or the device identifier.

At 612, the process 600 may include reading the message. For example, the provisioner application 502 may cause the second provisioning system 106 to read the message from the component 110.

At 614, the process 600 may include sending the message. For example, the provisioner application 502 may cause the second provisioning system 106 to send message data representing the message to the signature application 604. As discussed above, the signature application 604 may be executing within the hardware device that is attached to the second provisioning system 106. As such, the second provisioning system 106 may send the message data representing the message to the hardware device.

At 616, the process 600 may include signing the message using a private key and an attestation key. For example, the signature application 604 may sign the message using the private key and the attestation key. In some examples, the signature application 604 signs the message within the hardware device that is attached to the second provisioning system 106.

At 618, the process 600 may include sending a second certificate chain. For example, the signature application 604 may send certificate data representing the second certificate chain to the provisioner application 602. In some examples, the certificate chain may include the signed message and the attestation key. In some examples, the message may further include a product certificate, a manufacturer certificate, and/or a root certificate.

At 620, the process 600 includes storing the second certificate chain on the component. For example, the provisioner application 602 may cause the second provisioning system 106 to store the certification data representing the second certificate chain on the component 110.

At 622, the process 600 may include rebooting the component. For example, the provisioner application 602 may cause the second provisioning system 106 to send a command to the component 110 that causes the component 110 to reboot. In some examples, during the reboot, the component 110 may further remove any data from the volatile memory of the component 110.

At 624, the process 600 may include verifying a public key and a private key pair. For example, the provisioner application 602 may cause the second provisioning system 106 to send a command to the component 110 that causes the component 110 to verify the key data representing the public key and private key pair stored on the component 110. In some examples, to perform the verification, the component 110 encrypts a message using the private key. The component 110 then decrypts the encrypted message using the public key in order to retrieve the message. If the retrieved message is similar to (e.g., the same as) the original message, then the component 110 may verify the public key and private key pair. However, the retrieved message is not similar to (e.g., different than) the original message, then the component 110 may not verify the public key and private key pair.

At 626, the process 600 may include reading the certificate chain. For example, the provisioner application 602 may cause the second provisioning system 106 to read the second certificate chain stored on the component 110.

At 628, the process 600 may include verifying the second certificate chain. For example, the provisioner application 602 may cause the second provisioning system 106 to verify the second certificate chain. In some examples, to verify the second certificate chain, the second provisioning system 106 may verify that the message includes the serial number, the product device type, and/or the device identifier. In such examples, based on determining that the message includes the serial number, the product device type, and the device identifier, the second provisioning system 106 may verify the second certificate chain. However, based on determining that the certificate signing request does not include at least one of the serial number, the product device type, or the device identifier, the second provisioning system 106 may not verify the second certificate chain.

At 630, the process 600 may include securing the provisional data. For example, the provisional application 602 may cause the second provisional system 106 to send a command to the component 110 that causes the component 110 to secure the provisional data. The provisional data may include, but is not limited to, the product device type data representing the product device type, the device data representing the code, and/or the certificate data representing the second certificate chain. In some examples, to secure the component 110, the component 110 may remove any necessary bits stored on the component 110. Additionally, in some examples, to secure the component 110, one or more of the command line interfaces running on the component 110 are disabled. For instance, the component 110 may disable all of the command line interfaces running on the component 110. This may include "blowing" e-fuse bits which control the command line interfaces running on the component 110.

Figure 7A:
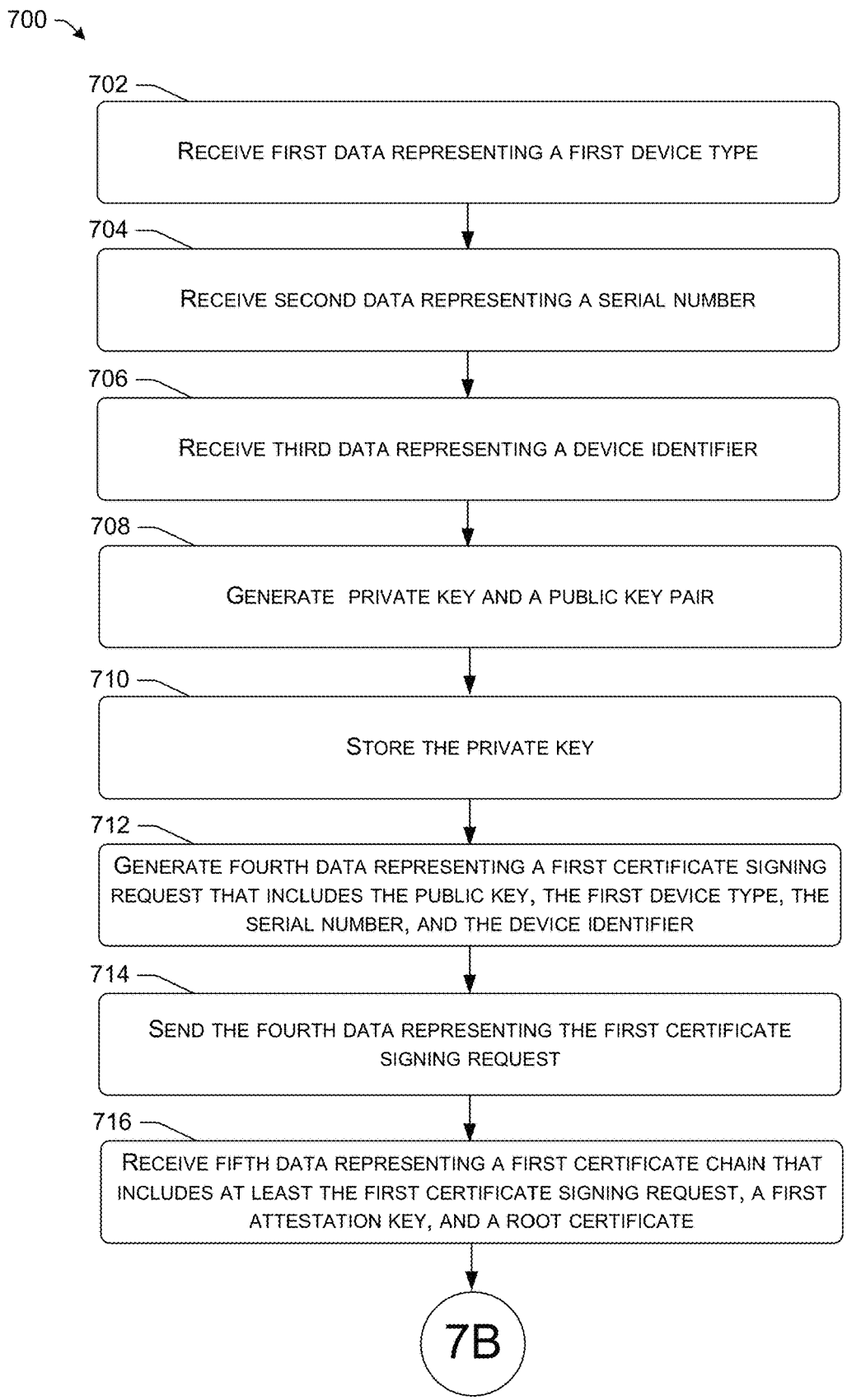
FIGS. 7A-7B illustrate an example process for provisioning a component of a device.
Figure 7B:
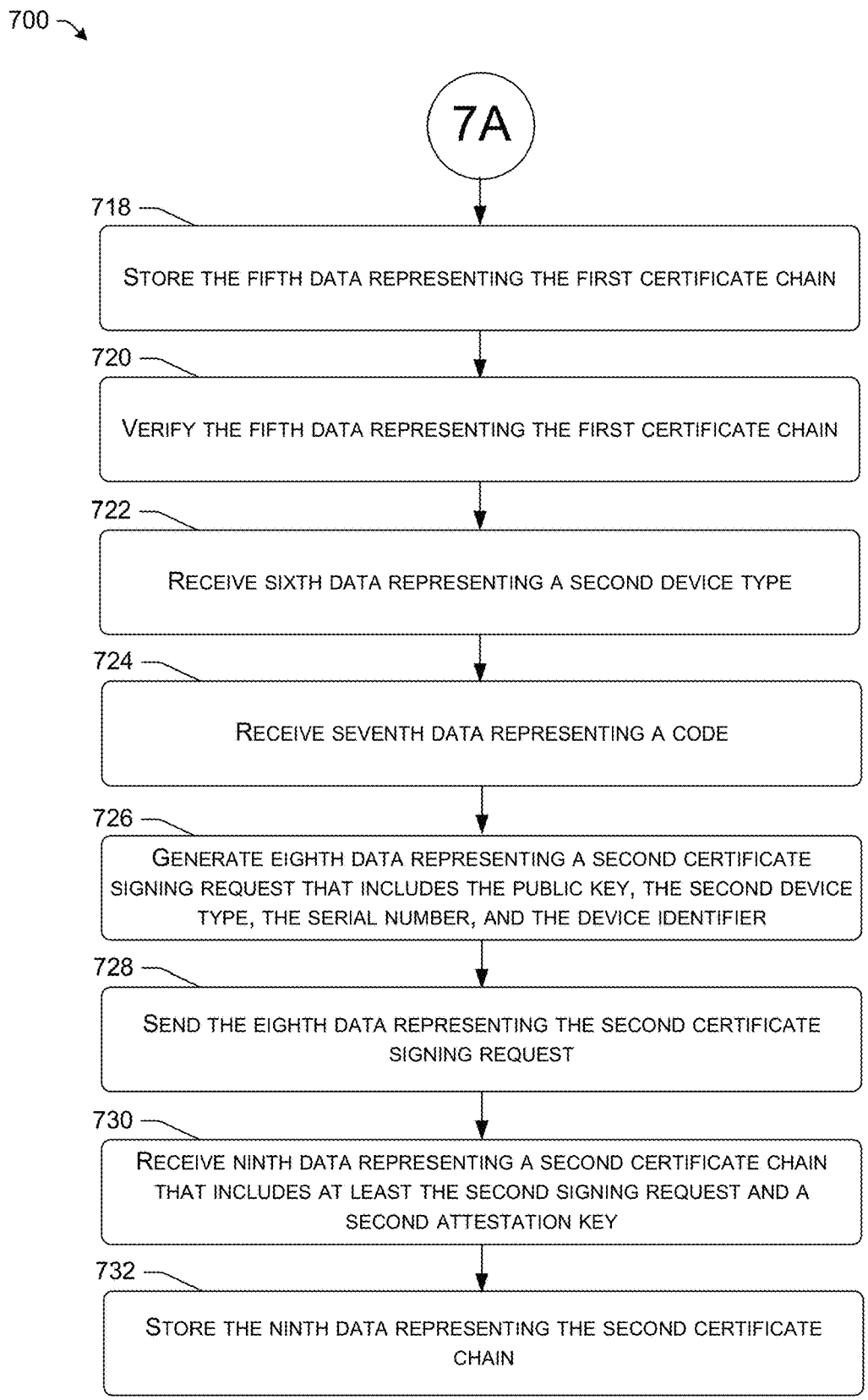

FIGS. 7A-7B illustrate an example process 700 for provisioning a component of a device. At 702, the process 700 may include receiving first data representing a first device type. For example, a component may receive the first data (e.g., uniform device type data) representing the first device type (e.g., a uniform device type). In some examples, the component receives the first data from a first provisioning system. In some examples, the first provisioning system may be associated with a component manufacturer. The component may then store the first data in a memory.

At 704, the process 700 may include receiving second data representing a serial number. For example, the component may receive the second data (e.g., number data) representing the serial number. In some examples, the component receives the second data from the first provisioning system. The component may then store the second data in the memory.

At 706, the process 700 may include receiving third data representing a device identifier. For example, the component may receive the third data (e.g., device identifier data) representing the device identifier. In some examples, the component receives the third data from the first provisioning system. The component may then store the third data in the memory.

At 708, the process 700 may include generating a private key and public key pair. For example, the component may generate key data representing the private key and public key pair. In some examples, the component generates the key data based on receiving a command from the first provisioning system. In some examples, the private key is associated with the component and as such, does not leave the component.

At 710, the process 700 may include storing the private key. For example, the component may store the key data representing the private key in the memory. In some examples, the component may further store the key data representing the public key in the memory.

At 712, the process 700 may include generating fourth data representing a first certificate signing request that includes the public key, the first device type, the serial number, and the device identifier. For example, the component may utilize at least a portion of the data stored in the memory to generate the fourth data representing the first certificate signing request. In some examples, the component generates the fourth data based on receiving a command from the first provisioning system.

At 714, the process 700 may include sending the fourth data representing the first certificate signing request. For example, the component may send the fourth data representing the first certificate signing request to the first provisioning system.

At 716, the process 700 may include receiving fifth data representing a first certificate chain that includes at least the first certificate signing request, a first attestation key, and a root key. For example, the component may receive the fifth data representing the first certificate chain. In some examples, the component receives the fifth data from the first provisioning system. In some examples, the first certificate signing request included in the first certificate chain is signed using the first attestation key and a private key. In some examples, the first certificate chain further includes a first product certificate and/or a first manufacturer certificate.

At 718, the process 700 may include storing the fifth data representing the first certificate chain. For example, the component may store the fifth data representing the first certificate chain in the memory.

At 720, the process 700 may include verifying the fifth data representing the first certificate chain. For example, the component may verify the fifth data representing the first certificate chain. In some examples, to perform the verification, the component may verify that that first certificate signing request included in the first certificate chain includes the first device type, the serial number, and the device identifier. In some examples, the component verifies the fifth data representing the first certificate chain based on receiving a command from a second provisioning system. The second provisioning system may be associated with a device manufacturer.

At 722, the process 700 may include receiving sixth data representing a second device type. For example, the component may receive the sixth data (e.g., product device type data) representing the second device type (e.g., the product device type). In some examples, the component receives the sixth data from the second provisioning system. In some examples, the second device type may be associated with one or more capabilities of a device. The component may then store the sixth data in the memory.

At 724, the process 700 may include receiving seventh data representing a code. For example, the component may receive the seventh data (e.g., device data) representing the code (e.g., advertised product identifier). In some examples, the code may be associated with the device. In some examples, the component receives the seventh data from the second provisioning system. The component may then store the seventh data in the memory.

At 726, the process 700 may include generating eighth data representing a second certificate signing request that includes the public key, the second device type, the serial number, and the device identifier. For example, the component may utilize at least a portion of the data stored in the memory to generate the eighth data representing the second certificate signing request. In some examples, the component generates the eighth data based on receiving a command from the second provisioning system.

At 728, the process 700 may include sending the eighth data representing the second certificate signing request. For example, the component may send the eighth data representing the second certificate signing request to the second provisioning system.

At 730, the process 700 may include receiving ninth data representing a second certificate chain that includes at least the second certificate signing request and a second attestation key. For example, the component may receive the ninth data representing the second certificate chain. In some examples, the component receives the ninth data from the second provisioning system. In some examples, the second certificate signing request included in the second certificate chain is signed using the second attestation key and another private key. In some examples, the second certificate chain further includes a second product certificate, a second manufacturer certificate, and/or the root certificate.

At 730, the process 700 may include storing the ninth data representing the second certificate chain. For example, the component may store the ninth data representing the second certificate chain in the memory.

Figure 8:
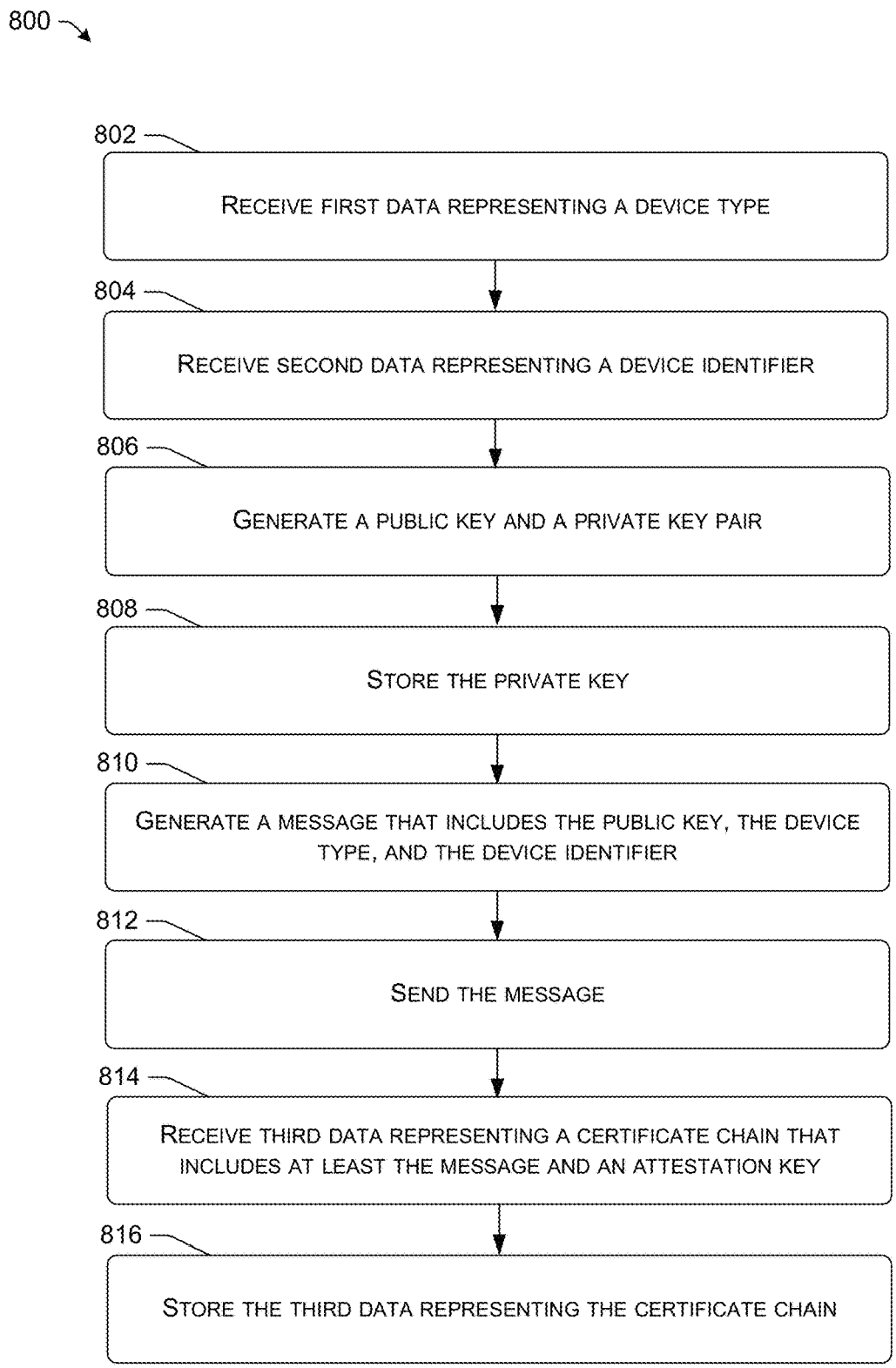
FIG. 8 illustrates an example process for provisioning a component.

FIG. 8 illustrates an example process 800 for provisioning a component. At 802, the process 800 may include receiving first data representing a device type. For example, a component may receive the first data representing the device type. In some examples, the component receives the first data from a provisioning system associated with a component manufacturer. For instance, the first data may include uniform device type data representing a uniform device type. In some examples, the component receives the first data from a provisioning system associated with a device manufacturer. For instance, the first data may include product device type data representing a product device type. In either example, the component may then store the first data in a memory.

At 804, the process 800 may include receiving second data representing a device identifier. For example, the component may receive the second data (e.g., device identifier data) representing the device identifier. In some examples, the component receives the second data from the provisioning system associated with the component manufacturer. The component may then store the second data in the memory.

At 806, the process 800 may include generating a private key and public key pair. For example, the component may generate key data representing the private key and public key pair. In some examples, the component generates the key data based on receiving a command. In some examples, the private key is associated with the component and as such, does not leave the component.

At 808, the process 800 may include storing the private key. For example, the component may store the key data representing the private key in the memory. In some examples, the component may further store the key data representing the public key in the memory.

At 810, the process 800 may include generating a message that includes the public key, the device type, and the device identifier. For example, the component may utilize at least a portion of the data stored in the memory to generate the message. In some examples, the component generates the message based on receiving a command from the provisioning system associated with the component manufacturer. In some examples, the component generates the message based on receiving a command from the provisioning system associated with the device manufacturer.

At 812, the process 800 may include sending the message. For example, the component may send the message. In some examples, the component sends the message to the provisioning system associated with the component manufacturer.

In some examples, the component sends the message to the provisioning system associated with the device manufacturer.

At 814, the process 800 may include receiving third data representing a certificate chain that includes at least the message and an attestation key. For example, the component may receive the third data representing the certificate chain. In some examples, the component receives the third data from the provisioning system associated with the component manufacturer. In some examples, the component receives the third data from the provisioning system associated with the device manufacturer. In some examples, the certificate chain further includes a product certificate, a manufacturer certificate, and/or a root certificate.

At 816, the process 800 may include storing the third data representing the certificate chain. For example, the component may store the third data representing the certificate chain in the memory.

Figure 9:
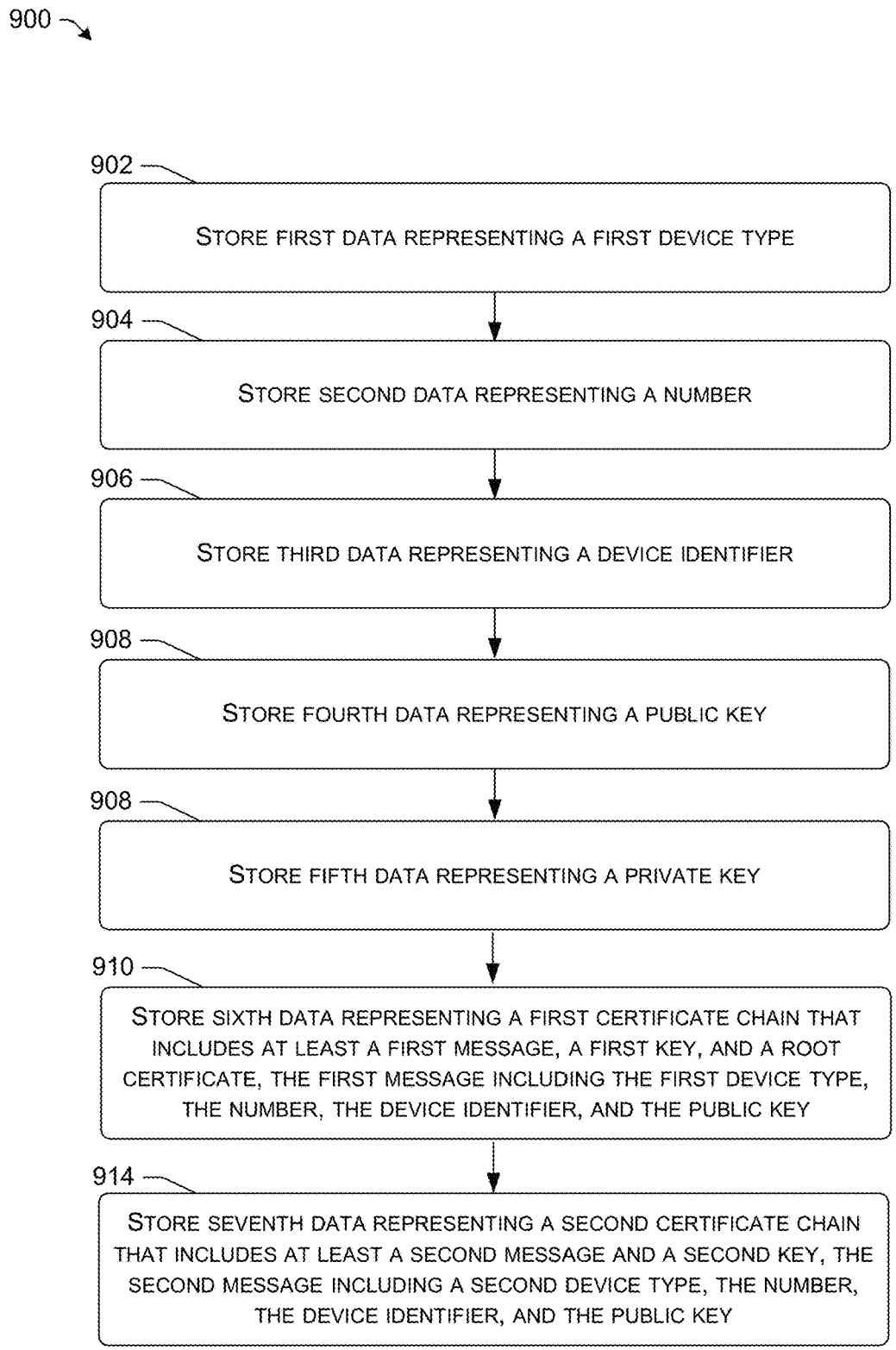
FIG. 9 illustrates an example process for storing data on a component during a provisioning process.

FIG. 9 illustrates an example process 900 for storing data on a component during a provisioning process. At 902, the process 900 may include storing first data representing a first device type. For example, a component may store the first data (e.g., uniform device type data) representing the device type (e.g., the uniform device type). In some examples, the component receives the first data from a first provisioning system associated with a component manufacturer.

At 904, the process 900 may include storing second data representing a number. For example, the component may store the second data (e.g., number data) representing the number (e.g., serial number). In some examples, the component receives the second data from the first provisioning system.

At 906, the process 900 may include storing third data representing a device identifier. For example, the component may store the third data (e.g., device identifier data) representing the device identifier. In some examples, the component receives the third data from the first provisioning system.

At 908, the process 900 may include storing fourth data representing a public key. For example, the component may store the fourth data representing the public key. In some examples, the component may generate the fourth data representing the public key.

At 910, the process 900 may include storing fifth data representing a private key. For example, the component may store the fifth data representing the private key. In some examples, the component may generate the fifth data representing the private key.

At 912, the process 900 may include storing sixth data representing a first certificate chain that includes at least a first message, a first key, and a root certificate, the first message including the first device type, the number, the device identifier, and the public key. For example, the component may store the sixth data representing the first certificate chain. In some examples, the first certificate chain further includes a first product certificate and/or a first manufacturer certificate. In some examples, the component receives the sixth data from the first provisioning system.

At 914, the process 900 may include storing seventh data representing a second certificate chain that includes at least a second message and a second key, the second message including a second device type, the number, the device identifier, and the public key. For example, the component may store the seventh data representing the second certificate chain. In some examples, the second certificate chain further includes a second product certificate, a second manufacturer certificate, and/or the root certificate. In some examples, the component receives the seventh data from a second provisioning system associated with a device manufacturer.

Figure 10:
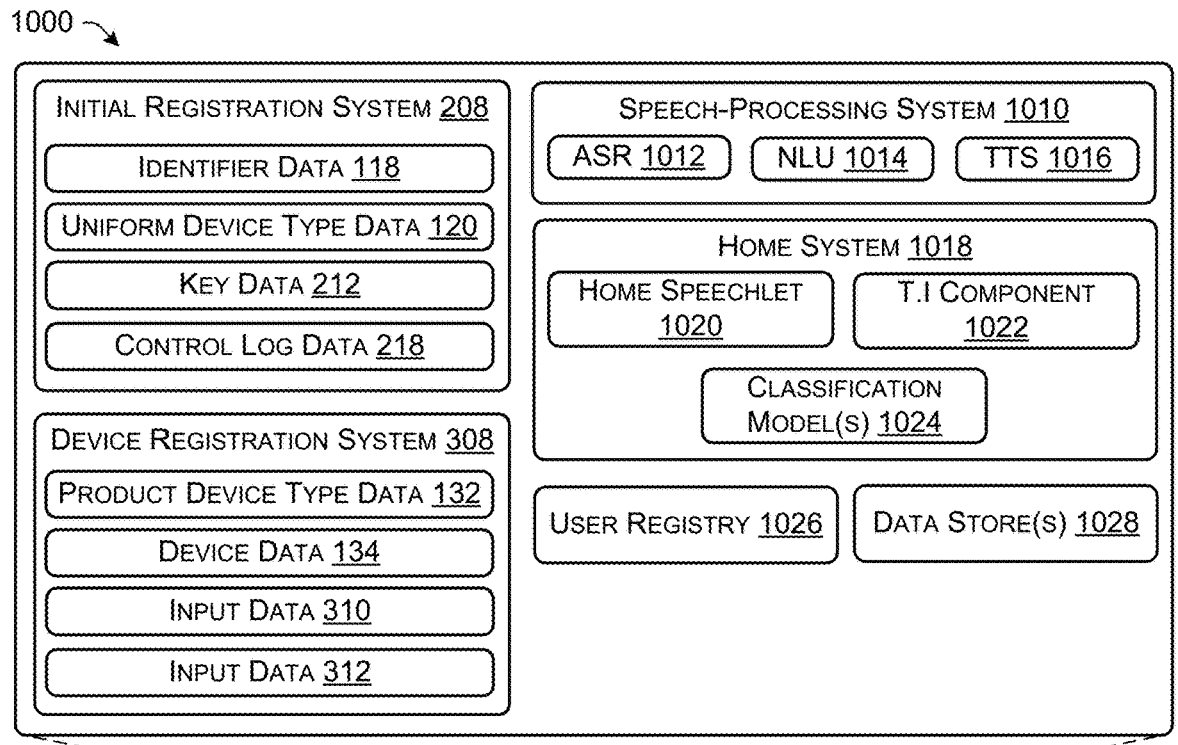
FIG. 10 illustrates a schematic diagram of an example environment that includes provisioned devices.
Figure 10:
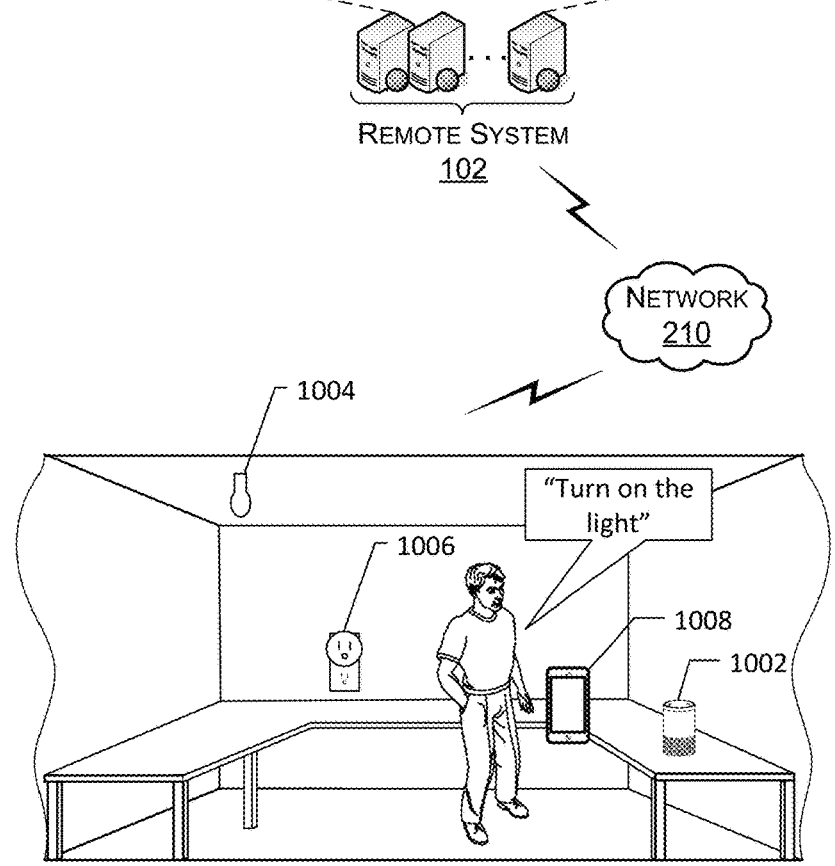

FIG. 10 illustrates a schematic diagram of an example system 1000 that includes devices with provisioned components. The system 1000 may include, for example, a voice-enabled device 1002. The voice-enabled device 1002 may be configured to receive user utterances and perform operations in response to such user utterances. In these examples, the voice-enabled device 1002 may be "hands free" such that interactions with the devices are performed through audible requests and responses. The voice-enabled device 1002 may be located or otherwise situated in an environment.

The system 1000 may also include at least a first device 1004 that includes a first component (not shown) and a second device 1006 that includes a second component (not shown). The first device 1004 and the second device 1006 may be described as "smart" devices, where the components installed within the first device 1104 and the second device 1006 are configured to send and/or receive data from other devices. In some examples, the first device 1004 and/or the second device 1006 may also be configured to receive user utterances and perform operations in response. In the example of FIG. 10, the first device 1004 may include a lightbulb and the second device 1006 may include a plug. In some examples, the first device 1004 and the second device 1006 may be "paired" or otherwise associated with the voice-enabled device 1002. As such, the first component of the first device 1004 and the second component of the second device 1006 may be configured to send data to and/or receive data from the voice-enabled device 1002.

The system 1000 may also include a personal device 1008, which may include a mobile device such as a mobile phone. The personal device 1008 may be associated with the voice-enabled device 1002, the first device 1004, and/or the second device 1006. In these examples, the personal device 1008 may be configured to send data to and/or receive data from the voice-enabled device 1002, the first component of the first device 1004, and/or the second component of the second device 1006.

The voice-enabled device 1002, the first component of the first device 1004, the second component of the second device 1006, and/or the personal device 1008 may be configured to send data to and/or receive data from the remote system 102, such as via the network 210. In examples, one or more of the components of the system 1000 may communicate directly with the remote system 102, via the network 210. In other examples, one or more of the first component of the first device 1004 and the second component of the second device 1006 may communicate with the voice-enabled device 1002, and the voice-enabled device 1002 may communicate with the remote system 102. Additionally, the personal device 1008 may communicate directly with the voice-enabled device 1002, the first component of the first device 1004, the second component of the second device 106, and/or the remote system 102. In further examples, a hub device, not shown in FIG. 10, may be utilized by the first device 1004, the second device 1006, and/or the voice-enabled device 1002 to send data to and/or receive data from other devices.

The first device 1004 may be associated with first device capabilities and the second device 1006 may be associated with second device capabilities. The first component may be utilized to cause the first device 1004 to perform actions associated with the first capabilities and the second component may be utilized to cause the second device 1006 to perform actions associated with the second capabilities. For example, the first device 1004 may be a lightbulb, and in this example, and the first capabilities may include turning on the lightbulb and turning off the lightbulb. By way of further example, the second device 1006 may be a wall plug, and in this example, the second capabilities may include causing electricity to flow or not flow to a device that is plugged in to the wall plug.

The remote system 102 may include a speech-processing system 1010 that includes an automatic speech recognition (ASR) component 1012, a natural language understanding (NLU) component 1014, and a text-to-speech (TTS) component 1016. The remote system 102 may further include a home system 1018 that includes a home speechlet 1020, a target-inference component 1022, and/or one or more classification models 1024. The remote system 102 may further include a user registry component 1026 and data store(s) 1028. Each of the components described herein with respect to the remote system 102 may be associated with their own systems, and/or some or all of the components may be associated with a single system. The components of the remote system 102 are described herein.

The user registry component 1026 may be configured to identify, determine, and/or generate associations between users, user accounts, and/or devices. For example, one or more associations between user profiles and user accounts may be identified, determined, and/or generated by the user registry 1026. The user registry 1026 may additionally store information indicating one or more devices accessible to and/or enabled for a given user account. Additionally, the user registry 1026 may include information indicating device identifiers, such as naming identifiers, associated with a given user account, as well as device types associated with the device identifiers. The user registry 1026 may also include information indicating user account identifiers, naming indicators of devices associated with user accounts, and/or associations between the voice-enabled device 1002, the first device 1004, and the second device 1006. It should also be understood that the terms "user account" may be used to describe a set of data and/or functionalities associated with a given account identifier. For example, data identified, determined, and/or generated while using some or all of the system 1000 may be stored or otherwise associated with an account identifier. Data associated with the user accounts may include, for example, account access information, historical usage data, device-association data, and/or preference data.

The data store(s) 1028 may be configured to identify, determine, and/or generate data associated with use of the voice-enabled device 1002, the first device 1004, and the second device 1006. For example, the voice-enabled device 1002 may be utilized to cause the first device 1004 and/or the second device 1006 to operate. Usage data may be identified, determined, and/or generated that indicates some or each of these interactions. Timing data may also be identified, determined, and/or generated that indicates a time at which some or each of these interactions took place. Device-state data, prior-request data, and/or other usage data may also be identified, determined, and/or generated. It should be understood that while the user registry 1026 and the data store(s) 1028 are illustrated as separate components, the user registry 1026 and the data store(s) 1028 may be the same component.

The remaining components of the remote system 102 that are illustrated in FIG. 10 will be described below by way of an example use case. It should be noted that this use case is provided for illustrative purposes, and not by way of limitation. For example, a user may speak a user utterance of "turn on the light." The microphones of the voice-enabled device 1002 may capture audio corresponding to the user utterance and may generated audio data. The audio data may be sent, via the network 210, to the remote system 102 for speech processing. The ASR component 1012 may generate, based at least in part on the audio data, corresponding text data representing the text "turn on the light." The NLU component 1014 may generate, based at least in part on the text data, corresponding intent data indicating that the user utterance corresponds to a "turn on" intent and the device to be acted upon, otherwise described herein as the payload, is associated with the identifier "the light." The "turn on" intent may be associated with intents assigned to and/or otherwise associated with the home speechlet 1020.

The home speechlet 1020 may be configured to receive some or all of the intent data and attempt to determine which of the first device 1004 or the second device 1006 is associated with the "light" identifier. The home speechlet 1020, and/or another component of the remote system 102, may determine whether the identifier corresponds to one or more naming indicators associated with the first device 1004 or the second device 1006. In some examples, the identifier may not correspond to a naming indicator and/or the identifier may correspond to more than one naming indicator. In these and other examples, the remote system 102 may perform target-device resolution to determine whether to "turn on" the first device 1004 or the second device 1006.

For example, the home speechlet 1020 may call or otherwise request the target-inference component 1022 to perform the target-device resolution. The target-inference component 1022 may utilize data stored in the user registry 1026 and/or the data store(s) 1028 and/or from the audio data representing the user utterance along with one or more models to determine whether the first device 1004 or the second device 1006 should be acted upon. For example, the target-inference component 1022 of the remote system 102 may receive data from one or more sources as input into the classification model(s) 1024 for determining which target device should be acted upon in light of the identifier in the user utterance. The data may include, for example, naming indicators of the first device 1004 and the second device 1006 associated with the voice-enabled device 1002 from which the audio data was received, device-state data indicating historical activation and deactivation of the first device 1004 or the second device 1006, utterance data indicating historical operation of the first device 1004 or the second device 1006 by user utterances, prior-request data indicating the first device 1004 and/or the second device 1006 were activated and/or deactivated recently, device-affinity data indicating frequencies at which the first device 1004 and/or the second device 1006 are controlled by voice-enabled device 1002, current device state indicating the state of accessory devices at or near the time the audio data is received, and/or the audio data received from the voice-enabled device 1002.

Based at least in part on the features as described herein, the classification model(s) 1024 may determine whether the first device 1004 or the second device 1006 is most likely to correspond to the accessory device intended to be acted upon. For example, the classification model(s) 1024 may generate output data representing a ranked list of the first device 1004 and the second device 1006, with the highest-ranking device being the most likely device to be acted upon. The target-inference component 1022 may provide the naming indicator and/or device identifier of the highest-ranking device to the home speechlet 1020, for example, to generate directive data. In some examples, the directive data may represent a directive for the voice-enabled device 1002 and/or other components of the remote system 102 to perform a directive, such as activation of the, on the highest-ranking device. The remote system 102 may then send the directive data to the voice-controlled device 1002. Based on the directive data, the voice-controlled device 1002 may send data to the first component of the first device 1004, where the data causes the first component to perform the directive (e.g., activating the lightbulb).

Additionally, or alternatively, in some examples, the directive data may represent a directive for the first component to perform the directive, such as activation of the light. The remote system 102 may then send the directive data directly to the first component. Based on receiving the directive data, the first component may perform the directive, such as by causing the light to activate.

In some examples, the first device 1004 may include microphones that capture the audio corresponding to the user utterance and may generated audio data. Similar to the voice-controlled device 1002, the first component may send the audio data t, via the network 210, to the remote system 102 for speech processing. The ASR component 1012 may generate, based at least in part on the audio data, corresponding text data representing the text "turn on the light." The NLU component 1014 may generate, based at least in part on the text data, corresponding intent data indicating that the user utterance corresponds to a "turn on" intent and the device to be acted upon, otherwise described herein as the payload, is associated with the identifier "the light." The "turn on" intent may be associated with intents assigned to and/or otherwise associated with the home speechlet 1020.

The remote system 102 may then generate the directive data representing the directive for the first component to perform the directive, such as activation of the light. The remote system 102 may then send the directive data directly to the first component. Based on receiving the directive data, the first component may perform the directive, such as by causing the light to activate.

The speechlet(s) described herein may include a speech-enabled web component that may run in the remote system 102. Speechlet(s) may receive and respond to speech-initiated requests. Speechlet(s) may define life-cycle events for a skill as experienced by a user, a way to process speech requests from the user, and/or call-backs from events happening on the device the user is interacting with. Given speechlet(s) may be capable of handling certain intents. For example, the NLU component may generate intent data that indicates an intent as well as a payload associated with the intent. A speechlet may be associated with the intent, and thus the intent data, including the payload may be sent to and received by the speechlet. The speechlet may process that intent by analyzing the payload and generating data representing a directive and/or instruction to perform an action. The directive and/or instruction may be sent to other components of the system for performance of the action.

Figure 11:
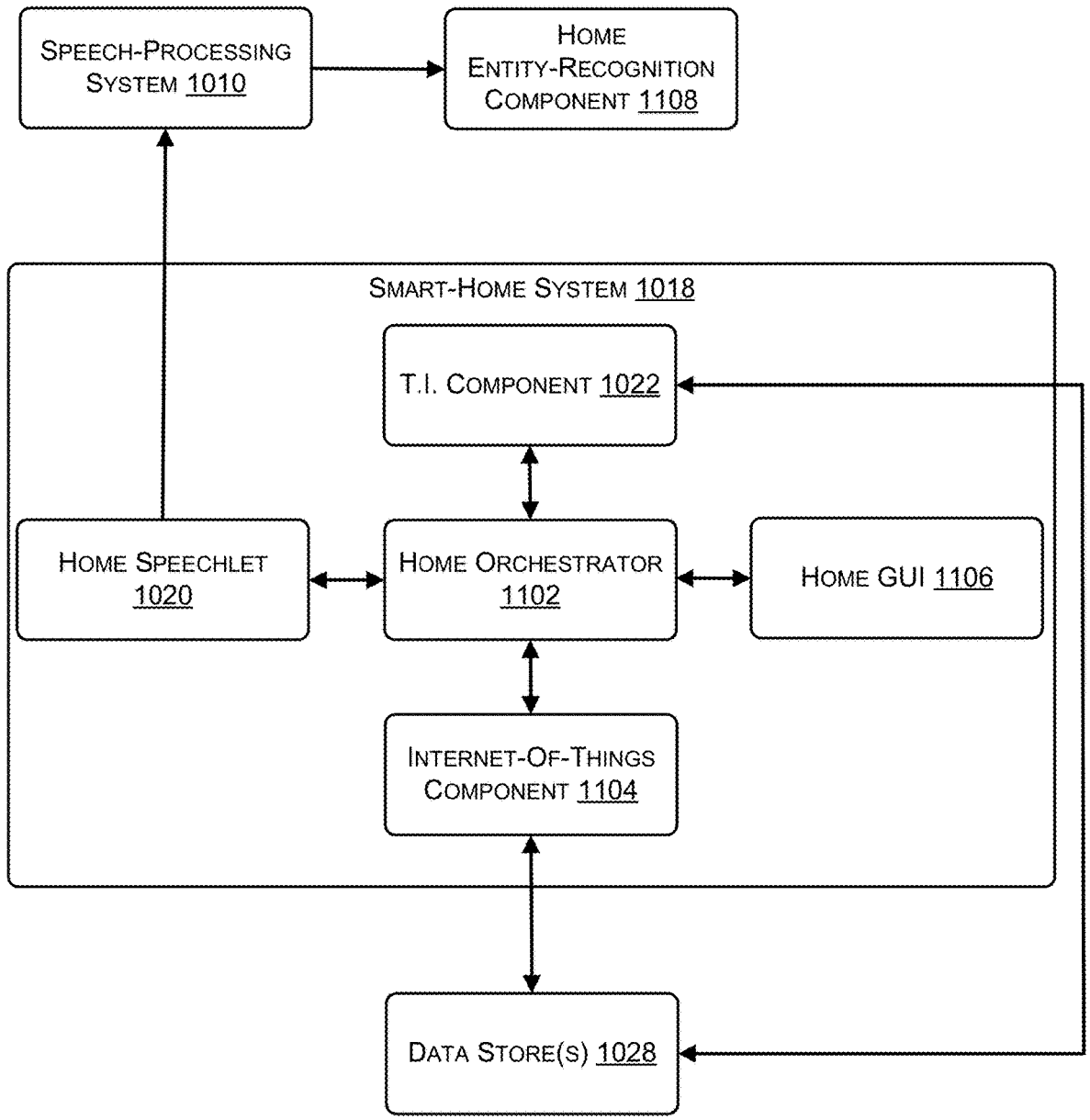
FIG. 11 illustrates a conceptual diagram of a smart-home system utilized for controlling devices.

FIG. 11 illustrates a conceptual diagram of the home system 1018 utilized for controlling devices. The home system 1018 may include components described above with respect to FIG. 10, such as a home speechlet 1020 and a target-inference component 1022. The home system 1018 may also be configured to send data to and receive data from other components of a remote system and/or one or more other systems. For example, the other components may include the speech-processing system 1010 and one or more data stores 1028. The home system 1018 may also include components such as a home orchestrator 1102, a home graphical user interface (GUI) 1104, and/or an internet-of-things component 1106. Each of these components will be described in detail below.

As described herein, a user may interact with devices that include the components described herein, such as by tactile input to a device, voice input to a voice-enabled device, and/or input to an application residing on and/or accessible to a personal device. In some examples, when a user interacts using voice input to a voice-enabled device, audio data representing user utterances may be received at the speech-processing system 1010. The speech-processing system 1010 may analyze the audio data and/or corresponding text data generated, by way of example, using an ASR component, to determine that the user utterance represents an intent to control a device. To determine the intent associated with the user utterance, the speech-processing system 1010 may utilize a home entity-recognition component 1108, which may be utilized to inform one or more intents available to the speech-processing system 1010 and/or to inform one or more values associated with the intents. For example, the user utterance of "turn off bedroom lights" may be analyzed by the speech-recognition component 1010. The home entity-recognition component 1108 may train or otherwise provide data to the speech-processing system 1010 indicating intents associated with capabilities of accessory devices, such as "turn on," "turn off," "activate," "deactivate," "dim," "brighten," "lock," "unlock," etc. The home entity-recognition component 1108 may additionally, or alternatively, provide data indicating identifiers and/or payloads associated with such intents, such as "light," "lights," "lock," "outlet," "switch," etc. It should be understood that while the home entity-recognition component 1108 is depicted in FIG. 11 as being a component separate from the home system 1018, the home entity-recognition component 1108 may be a component of the home system 1018.

The speech-processing system 1010 may be configured to determine that the intent corresponds to a capability configured to be performed by the home system 1018, and based at least in part on such a determination, the speech-processing system 1010 may provide the intent data and/or other data associated with the request to the home speechlet 1020 of the home system 1018. The home orchestrator 1102 may be configured to receive data indicating that the home speechlet 1020 has been invoked to determine a directive to be performed with respect to a device and may query one or more other components of the home system 1018 to effectuate the request. For example, the home orchestrator 1102 may query the internet-of-things component 1104 to identify naming indicators associated with devices for a particular user account. The internet-of-things component 1104 may query the data store(s) 1028 and/or the user account for such naming indicators. The internet-of-things component 1104 may return the naming indicators to the home speechlet 1020, which may identify which naming indicator corresponds to the identified target device from the user utterance.

In other examples, such as when the home speechlet 1020 and/or the internet-of-things component 1104 cannot determine which device corresponds to the identified target device, the home orchestrator 1102 may query the target-inference component 1022 to perform target-device resolution as described herein. For example, the target-inference component 1022 may utilize one or more models as described herein to generate output data representing a ranked list of accessory devices. This information may be utilized to select the highest-ranking accessory device as the identified target device from the user utterance.

Additionally, or alternatively, as mentioned above, the devices may be operated based at least in part on input data received from an application residing on and/or accessible to a personal device, such as a mobile phone and/or computer. The home GUI 1106 may be utilized to receive the input data and/or to display recommendations and/or requests to a user. For example, the home GUI 1106 may be utilized to display a request to confirm that a selected accessory device is the desired device to be acted upon.

In either of the examples above, the home system 1018 and/or the speech-processing system 1010 may send data that causes the device to perform the desired capability. In some examples, the data is sent to the component installed within the device. In some examples, the data is sent to a different device (e.g., a voice-controlled device), which then sends the data to the component installed within the device. In either example, the component may receive the data and, in response, cause the device to perform the capability.

Figure 12:
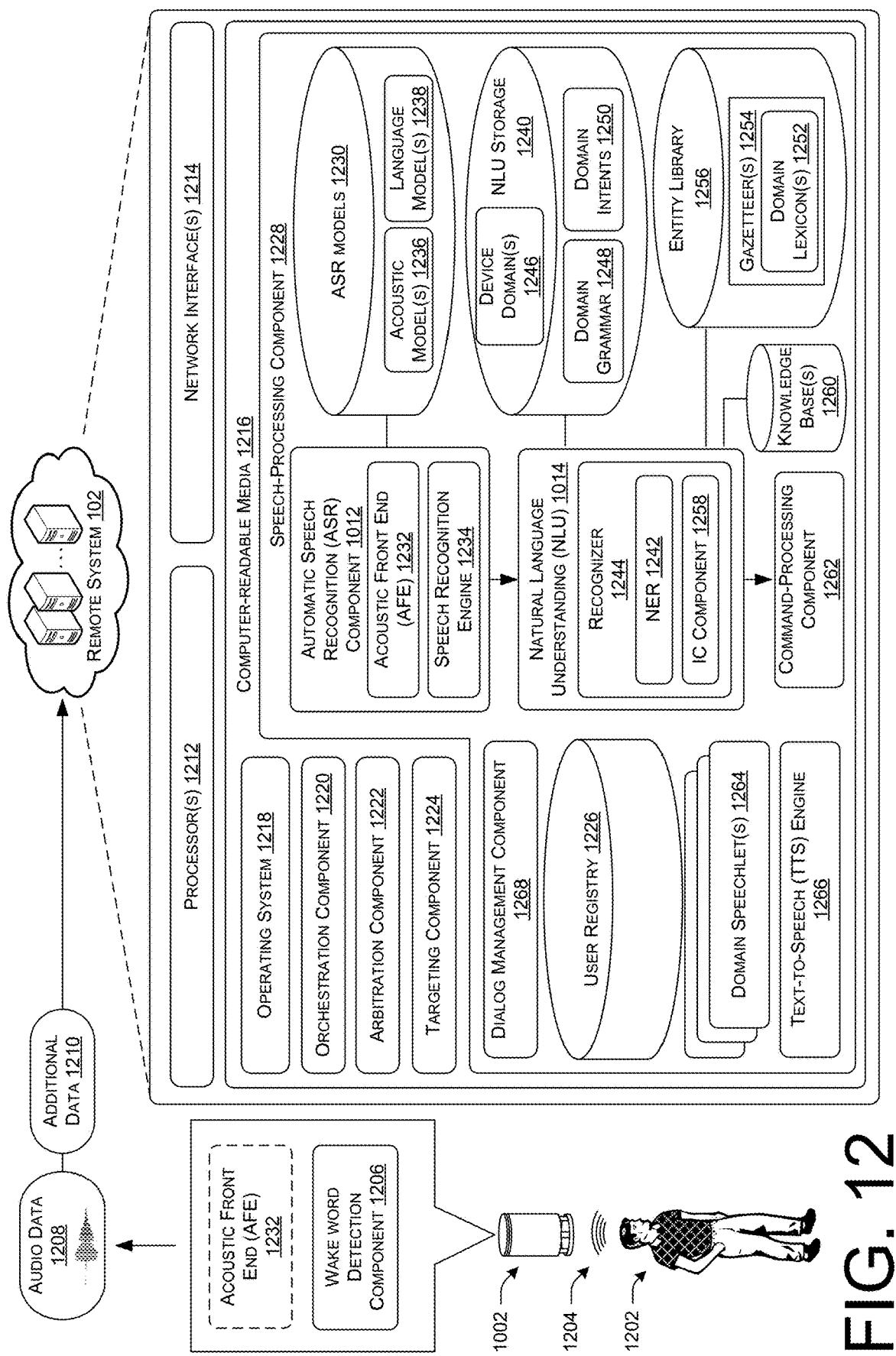
FIG. 12 illustrates a block diagram of an example architecture of a speech-processing system which receives audio data and/or additional data from user devices, and performs techniques to determine how to respond to a voice command of a user represented in the audio data.

FIG. 12 illustrates a block diagram of an example architecture of a speech processing system which receives audio data and/or addition data from voice-enabled devices, and performs techniques to determine how to respond to a voice command of a user represented in the audio data. The block diagram of FIG. 12 illustrates an example architecture of a speech processing system (e.g., remote system 102) which receives audio data 1028 and additional data 1210 (e.g., metadata such as timestamps, SRN values, etc.) from voice-enabled devices 1002, and performs techniques to determine which of the voice-enabled devices is to respond to a voice command 1024 of the user 1022 represented in the audio data 1028.

FIG. 12 includes a conceptual diagram of how a voice command 1024 can be processed, allowing a system to capture and execute commands spoken by a user 1022, such as spoken commands that may follow a wakeword. The various components illustrated may be located on a same or different physical devices. Communication between various components illustrated in FIG. 12 may occur directly, or across a network. An audio capture component, such as a microphone of voice-enabled device 1002, captures audio corresponding to a voice command 1024. The voice-enabled device 1002, using a wakeword detection component 1026, then processes the voice command 1024, or audio data corresponding to the voice command 1024, to determine if a keyword (such as a wakeword) is detected in the voice command 1024. Following detection of a wakeword, the voice-enabled device 1002 sends an audio data 1028 corresponding to the voice command 1024, to a computing device of the remote system 102 that includes the ASR component 1012. The audio data 1028 may be output from an acoustic front end (AFE) 1232 located on the voice-enabled device 1002 prior to transmission. Or, the audio data 1028 may be in a different form for processing by a remote AFE 1232, such as the AFE 1232 located with the ASR component 1012.

In various examples, the remote system 102 may include one or more processors 1212 to power components, devices, and actions of the remote system 102, and one or more network interfaces 1214 such as a wireless or Wi-Fi network communications interface, an Ethernet communications interface, a cellular network communications interface, a Bluetooth communications interface, etc., for communications by the remote system 102 over various types of networks (e.g., network(s) 118), including wide-area network, local-area networks, private networks, public networks etc. In the case of a wireless communications interfaces, such interfaces may include radio transceivers and associated control circuits and logic for implementing appropriate communication protocols.

The remote system 102 may further include computer-readable media 1216 which stores various components, components, or other executable software to perform various arbitration actions to determine which voice-enabled device 1002 is to respond to a command in the voice command 1024. The computer-readable media 1216 may store an operating system 1218 that is configured to manage hardware and services within and coupled to the remote system 102.

The computer-readable media 1216 may further include an orchestration component 1220, an arbitration component 1222, a targeting component 1224, and a user registry 1226 including device indications for the devices 1002 of the user 1022. The arbitration component 1222 may perform various functions or processes for determining a voice-enabled device 1002 to respond to a user 1022 based on metadata 116 for voice-enabled devices 1002 that generated audio data 1028 corresponding to a voice command 1024. The targeting component 1224 may perform various operations for determining which voice-enabled devices 1002 are to respond to a command in the voice command 1024. For instance, the targeting component 1224 may determine, using the user registry 1226, all of the voice-enabled devices 1002 and/or secondary devices associated with a user and/or household account. The targeting component 1224 may use the additional data 1210, intent expressed in the voice command 1024 determined by the NLU component 1014, and devices states stored in the user registry 1226 to determine which of the devices 1002 should perform the command indicated in the voice command 1024.

The remote system 102 may further include a speech-processing component 1228, which includes various components for processing a voice command 1024, such as the automatic speech recognition (ASR) component 1012 and the natural language understanding (NLU) component 1014. The various components illustrated may be located on a same or different physical devices.

In some examples, audio data (e.g., audio data 1028) may be received by the remote system 102 for speech processing for interpretation of the included voice command 1024 (either for purposes of enabling voice-communications and/or for purposes of executing a command in the speech). The audio data 1028 may include data corresponding to the wakeword, or the portion of the audio data corresponding to the wakeword may be removed by the voice-enabled device 1002 prior to sending. Upon receipt by the remote system 102, the ASR component 1012 may convert the audio data into text. The ASR component 1012 transcribes audio data into text data representing the words of the speech contained in the audio data. The text data may then be used by other components for various purposes, such as arbitration, executing system commands, inputting data, etc. A voice command 1024 in the audio data is input to a processor configured to perform ASR which then interprets the utterance based on the similarity between the utterance and pre-established ASR language models stored in an ASR model knowledge base (ASR Models Storage 1230). For example, the ASR process may compare the input audio data with models for sounds (e.g., subword units or phonemes) and sequences of sounds to identify words that match the sequence of sounds spoken in the utterance of the audio data.

The different ways a voice command 1024 may be interpreted (i.e., the different hypotheses) may each be assigned an ASR probability or an ASR confidence score representing the likelihood that a particular set of words matches those spoken in the utterance. The ASR confidence score may be based on a number of factors including, for example, the similarity of the sound in the utterance to models for language sounds (e.g., an acoustic model 1236 stored in an ASR Models Storage 1230), and the likelihood that a particular word which matches the sounds would be included in the sentence at the specific location (e.g., using a language or grammar model). Thus, each potential textual interpretation of the spoken utterance (hypothesis) is associated with an ASR confidence score. Based on the considered factors and the assigned ASR confidence score, the ASR component 1012 outputs the most likely text recognized in the audio data. The ASR component 1012 may also output multiple ASR hypotheses in the form of a lattice or an N-best list with each hypothesis corresponding to an ASR confidence score or other score (such as probability scores, etc.).

The device or devices performing the ASR processing may include an acoustic front end (AFE) 1232 and a speech recognition engine 1234. The acoustic front end (AFE) 1232 transforms the audio data from the microphone into data for processing by the speech recognition engine 1234. The speech recognition engine 1234 compares the speech recognition data with acoustic models 1236, language models 1238, and other data models and information for recognizing the speech conveyed in the audio data. The AFE 1232 may reduce noise in the audio data and divide the digitized audio data into frames representing time intervals for which the AFE 1232 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE 1232 to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1234 may process the output from the AFE 1232 with reference to information stored in speech/model storage (1230). Alternatively, post front-end processed data (such as feature vectors) may be received by the device executing ASR processing from another source besides the internal AFE 1232. For example, the voice-enabled device 1002 may process audio data into feature vectors (for example using an on-device AFE 1232) and transmit that information to a server across a network for ASR processing. Feature vectors may arrive at the remote system 102 encoded, in which case they may be decoded prior to processing by the processor executing the speech recognition engine 1234.

The speech recognition engine 1234 attempts to match received feature vectors to language phonemes and words as known in the stored acoustic models 1236 and language models 1238. The speech recognition engine 1234 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 1234 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1234 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 102, for natural language understanding (NLU) processing, such as conversion of the text into commands for execution, either by the voice-enabled device, by the remote system 102, or by another device (such as a server running a specific application like a search engine, etc.).

The NLU component 1014 (e.g., server) may include various components, including potentially dedicated processor(s), memory, storage, etc. As shown in FIG. 12, the NLU component 1014 may include a recognizer 1244 that includes a named entity recognition (NER) component 1242 which is used to identify portions of query text that correspond to a named entity that may be recognizable by the system. A downstream process called named entity resolution links a text portion to a specific entity known to the system. To perform named entity resolution, the system may utilize gazetteer information 1254 stored in entity library storage 1256. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU component 1014 takes textual input (such as the textual input determined by the ASR component 1012) and attempts to make a semantic interpretation of the text. That is, the NLU component 1014 determines the meaning behind the text based on the individual words and then implements that meaning. NLU component 1014 interprets a text string to derive an intent or a desired action from the user as well as the pertinent pieces of information in the text that allow a device (e.g., voice-enabled device 1002) to complete that action. For example, if a spoken utterance is processed using ASR component 1012 and outputs the text "turn off the alarm" the NLU component 1014 may determine that the user 1022 intended that the voice-enabled device 1002(2) be instructed to turn off an alarm sound being output. As another example, if the spoken utterance is processed using ASR component 1012 and outputs the text "hang up the phone" the NLU component 1014 may determine that the user 1022 intended that the voice-enabled device 1002(2) be instructed to hang up a phone through which a phone call is being performed.

The NLU component 1014 may process several textual inputs related to the same utterance. For example, if the ASR component 1012 outputs N text segments (as part of an N-best list), the NLU component 1014 may process all N outputs to obtain NLU results.

To correctly perform NLU processing of speech input, the NLU component 1014 may be configured to determine a "domain" of the utterance so as to determine and narrow down which services offered by the endpoint device (e.g., remote system 102 or the voice-enabled device 1002) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1242 receives a query in the form of ASR results and attempts to identify relevant grammars and lexical information that may be used to construe meaning. To do so, the NLU component 1014 may begin by identifying potential domains that may relate to the received query. The NLU storage 1240 includes a database of devices domains 1246 which identify domains associated with specific devices. For example, the voice-enabled device 1002 may be associated with domains for music, telephony, calendaring, contact lists, and device-specific communications, but not video. In addition, the device domains 1246 may include database entries about specific services on a specific device, either indexed by Device ID, User ID, or Household ID, or some other indicator.

In NLU processing, a domain may represent a discrete set of activities having a common theme, such as "shopping," "music," "calendaring," etc. As such, each domain may be associated with a particular recognizer 1244, language model and/or grammar databases 1248, a particular set of domain intents/actions 1250, and a particular personalized domain lexicon 1252. Each gazetteer 1254 may include domain-indexed lexical information associated with a particular user and/or device. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains is ordinarily selected to be the correct result.

An intent classification (IC) component 1258 parses the query to determine an intent or intents for each identified domain, where the intent corresponds to the action to be performed that is responsive to the query. Each domain is associated with a database (e.g., domain intents 1250) of words linked to intents. For example, a music domain intent database 1234 may link words and phrases such as "quiet," "volume off," and "mute" to a "mute" intent. A voice-message domain intent database, meanwhile, may link words and phrases such as "send a message," "send a voice message," "send the following," or the like. The IC component 1258 identifies potential intents for each identified domain by comparing words in the query to the words and phrases in the domain intents database 1250. In some instances, the determination of an intent by the IC component 1258 is performed using a set of rules or templates that are processed against the incoming text to identify a matching intent.

In order to generate a particular interpreted response, the NER 1242 applies the grammar models and lexical information associated with the respective domain to actually recognize a mention one or more entities in the text of the query. In this manner, the NER component 1242 identifies "slots" (i.e., particular words in query text) that may be needed for later command processing. Depending on the complexity of the NER component 1242, it may also label each slot with a type of varying levels of specificity (such as noun, place, city, artist name, song name, or the like). Each grammar model 1248 includes the names of entities (i.e., nouns) commonly found in speech about the particular domain (i.e., generic terms), whereas the lexical information 1252 from the gazetteer 1254 is personalized to the user(s) and/or the device. For instance, a grammar model associated with the shopping domain may include a database of words commonly used when people discuss shopping.

The intents identified by the IC component 1258 are linked to domain-specific grammar frameworks (included in 1248) with "slots" or "fields" to be filled. Each slot/field corresponds to a portion of the query text that the system believes corresponds to an entity. To make resolution more flexible, these frameworks would ordinarily not be structured as sentences, but rather based on associating slots with grammatical tags. For example, if "send a message" is an identified intent, a grammar (1248) framework or frameworks may correspond to sentence structures such as "Send a message to {contact}," "Send a voice message to {contact}," "Send the following to {contact}," etc.

For example, the NER component 1242 may parse the query to identify words as subject, object, verb, preposition, etc., based on grammar rules and/or models, prior to recognizing named entities. The identified verb may be used by the IC component 1258 to identify intent, which is then used by the NER component 1242 to identify frameworks. A framework for the intent of "send a message," meanwhile, may specify a list of slots/fields applicable to play the identified "contact" and any object modifier (e.g., specifying a device of the recipient) or the like. The NER component 1242 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1242 may search the database of generic words associated with the domain (in the knowledge base 1260). So, for instance, if the query was "send message to Joe," after failing to determine a last name for "Joe," the NER component 1242 may search the domain vocabulary for the word "Joe." In the alternative, generic words may be checked before the gazetteer information, or both may be tried, potentially producing two different results.

The output data from the NLU component 1014 (which may include tagged text, commands, etc.) may then be sent to the command-processing component 1262. The destination command-processing component 1262 may be determined based on the NLU output. For example, if the NLU output includes a command to send a message, the command-processing component 1262 may be a message sending application, such as one located on the voice-enabled device or in a message sending appliance, configured to execute a message sending command. If the NLU output includes a search request, the destination command processor 146 may include a search engine processor, such as one located on a search server, configured to execute a search command.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 1014 during runtime operations where NLU operations are performed on text (such as text output from an ASR component 1232). Each domain may have specially configured components to perform various steps of the NLU operations.

For example, in an NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1244. Each recognizer may include various NLU components such as an NER component 1242, IC component 1258 and other components such as an entity resolver, or other components.

As noted above, multiple devices may be employed in a single remote system 102. In such a multi-device system, each of the devices may include different components for performing different aspects of the speech processing. The multiple devices may include overlapping components. The components of the voice-enabled device 1002 and the remote system 102, as illustrated herein are exemplary, and may be located in a stand-alone device or may be included, in whole or in part, as a component of a larger device or system, may be distributed across a network or multiple devices connected by a network, etc.

FIG. 12 further illustrates that the command-processing component 1262 is configured to generate a command that the selected voice-enabled device 1002 uses to respond to the voice command 1024. As illustrated in FIG. 12, the remote system 102, including the orchestration component 1220, the ASR component 1012, and the NLU component 1014, may be coupled to the targeting component 1224 and provide the targeting component 1224 with the intent determined to be expressed in the voice command 1024. Further, the arbitration component 1222 may provide device indicators (e.g., IP addresses, devices names, etc.) for one or more of the voice-enabled devices 1002. The targeting component 1224 may then perform techniques to determine a target device (e.g., a device to perform the requested operation), and provide various data to the command-processing component 1262. For instance, the targeting component 1224 may provide the command-processing component 1262 with various device identifiers of the voice-enabled devices 1002, the determined target device, the determined intent and/or command, etc.

The command-processing component 1262 and/or NLU component 1014 may determine a domain based on the intent and, based on this determination, route the request corresponding to the audio data to the appropriate domain speechlet, such as the illustrated domain speechlets 1264. The domain speechlets 1264 may comprise any type of device or group of devices (e.g., hardware device, virtual devices or partitions, server, etc.), and may receive the text data and/or an intent associated with the audio data 1028 and determines how to respond to the request. For instance, the intent for a command "please hang up my phone call" may be routed to a smart home domain speechlet 1264 which controls devices connected to the voice-enabled devices 1002, such as a phone through which a phone call is being conducted. The smart home domain speechlet 1264 may determine a command to generate based on the intent of the user 1022 to hang up a phone call. Additionally, the smart home domain speechlet 1264 may determine additional content, such as audio data, to be output by one of the voice-enabled devices 1002(1) or 1002(2), such as "we have hung up your phone call."

Various types of domain speechlets 1264 may be used to determine which devices 1002 to use to respond to a voice command 1024, as well as the appropriate response and potential additional content (e.g., audio data). For example, the domain speechlets 1264 may include a third party skills domain speechlet 1264 which may handle intents associated with gaming, productivity, etc., a music domain speechlet 1264 which may handle intents associated with music play requests (e.g., Amazon Music, Pandora, Spotify, iHeart, etc.), a video domain speechlet 1264 which may handle intents associated with video play requests (e.g., Amazon Video, HBO, Netflix, Hulu, etc.), a household organization domain speechlet 1264 which may handle intents associated with household activities (e.g., calendars, reminders, timers, etc.), a smart home domain speechlet 1264 which may handle intents associated with controlling smart devices (e.g., controlling lights, door locks, home monitoring, etc.), an automotive domain speechlet 1264, a shopping domain speechlet 1264 which may handle shopping requests (e.g., making a shopping list, ordering items online, etc.), and/or a weather domain speechlet 1264 which may handle requests for weather forecasts (e.g., providing a URL to a weather website, providing weather related images and/or videos, etc.).

After the domain speechlet 1264 generates the appropriate command based on the intent of the user 1022, and/or provides additional content, such as audio data, to be output by one of the voice-enabled devices 1002 (e.g., "we have hung up your phone call"), the domain speechlet 1264 may provide this information back to the speech system 102, which in turns provides some or all of this information to a text-to-speech (TTS) engine 1266. The TTS engine 1266 then generates an actual audio file for outputting the second audio data determined by the domain speechlet 1264 (e.g., "we have hung up your phone call", or "we have turned off your alarm . . . "). After generating the file (or "audio data"), the TTS engine 1266 may provide this data back to the remote system 102.

The remote system 102 may then publish (i.e., write) some or all of this information to an event bus. That is, the remote system 102 may provide information regarding the initial request (e.g., the speech, the text, the domain/intent, etc.), the response to be provided to the voice-enabled device 1002 (e.g., the command to hang up a phone call, the command to turn off an alarm, etc.), or any other information pertinent to the interaction between the voice-enabled device 1002(1) and the remote system 102 to the event bus.

Within the remote system 102, one or more components or services may subscribe to the event bus so as to receive information regarding interactions between voice-enabled devices and the remote system 102. For instance, a device management component may subscribe to the event bus and, thus, may monitor information regarding these interactions. In some examples, monitoring information in the event bus may comprise communications between various components of the remote system 102. For example, the targeting component 1224 may monitor the event bus to identify device state data for voice-enabled devices 1002. In some examples, the event bus may "push" or send indications of events and/or device state data to the targeting component. Additionally, or alternatively, the event bus may be "pulled" where the targeting component 1224 sends requests to the event bus to provide an indication of device state data for a voice-enabled device 1002. The event bus may store indications of the device states for the devices 1002, such as in a database (e.g., user registry 1226), and using the stored indications of the device states, send the device state data for voice-enabled devices 1002 to the targeting component. Thus, to identify device state data for a device 1002, the targeting component 1224 may send a request to the event bus (e.g., event component) to provide an indication of the device state data associated with a device 1002, and receive, from the event bus, the device state data that was requested.

The device management component functions to monitor information published to the event bus and identify events that may trigger action. For instance, the device management component may identify (e.g., via filtering) those events that: (i) come from voice-enabled devices 1002, and (ii) are associated with supplemental content (e.g., image data, video data, etc.). The device management component may reference the user registry 1226 to determine which voice-enabled devices 1002 are associated with secondary devices, as well as determine device types, states, and other capabilities of these secondary devices. For instance, the device management component may determine, from the information published to the event bus, an identifier associated with the voice-enabled device 1002 making the corresponding request or the voice-enabled device 1002 selected to respond to the voice command 1024. The device management component may use this identifier to identify, from the user registry 1226, a user account associated with the voice-enabled device 1002. The device management component may also determine whether any secondary devices have been registered with the identified user account, as well as capabilities of any such secondary devices, such as how the secondary devices are configured to communicate (e.g., via WiFi, short-range wireless connections, etc.), the type of content the devices are able to output (e.g., audio, video, still images, flashing lights, etc.), and the like.

The computer-readable media 1216 may further include the user registry 1226 that includes data regarding user profiles as described herein. The user registry 1226 may be located part of, or proximate to, the remote system 102, or may otherwise be in communication with various components, for example over a network. The user registry 1226 may include a variety of information related to individual users, accounts, etc. that interact with the voice-enabled devices 1002, and the remote system 102. For illustration, the user registry 1226 may include data regarding the devices associated with particular individual user profiles. Such data may include user or device identifier (ID) and internet protocol (IP) address information for different devices as well as names by which the devices may be referred to by a user. Further qualifiers describing the devices may also be listed along with a description of the type of object of the device. Further, the user registry 1226 may store indications of associations between various voice-enabled devices 1002 and/or secondary device, such as virtual clusters of devices. The user registry 1226 may represent clusters of devices 1002 as single devices that can receive commands and disperse the commands to each device 1002 in the cluster. In some examples, the virtual cluster of devices may be represented as a single device which is determined as being capable, or not capable (e.g., offline), of performing a command in a speech utterance. A virtual cluster of devices may generally correspond to a stored grouping of devices, or a stored association between a group of devices.

In some examples, the device state for devices associated with a user account may indicate a current state of the device, such as voice-enabled devices 1002(1) and 1002(2). In this way, the command-processing component 1262 and/or the domain speechlets 1264 may determine, based on the stored device states in the user registry 1226, a current device state of the voice-enabled devices 1002. Rather than receiving device states for the voice-enabled devices 1002, in additional data 1210, the devices states may already have been determined or received and stored in the user registry 1226. Further, the user registry 1226 may provide indications of various permission levels depending on the user. As an example, the remote system 102 may perform speaker recognition on the audio data 1028 to determine an identity of the speaker. If the speaker is a child for instance, the child profile may have permission restrictions where they are unable to hang up a phone call of a parent, for example. Conversely, a parent profile may be able to hang up a phone call involving a child profile, or change channel on a television when a child profile is also detected as watching the television.

In some examples, to determine the device state, the event bus may publish different events which indicate device states to various entities or components that subscribe to the event bus. For instance, if an event of "set an alarm" occurs for a voice-enabled device 1002, the event bus may publish the indication of this event, and thus the device state of an alarm is set for the voice-enabled device 1002. Thus, various components, such as the targeting component 1224, may be provided with indications of the various device states via the event bus. The event bus may further store and/or update device states for the voice-enabled devices 1002 in the user registry 1226. The components of the remote system 102 may query the user registry 1226 to determine device states.

A particular user profile may include a variety of data that may be used by the system 120. For example, a user profile may include information about what user device 108 are associated with the user 102. The user profile may further indicate an IP address for each of the devices associated with the user 102, user IDs for each of the devices, indicates of the types of devices, and current device states for the devices.

The computer-readable media 410 may further store a dialog management component 1268 that is responsible for conducting speech dialogs with the user 102 in response to meanings or intents of user speech determined by the NLU component 1014. The dialog management component 408 may include domain logic that is used to analyze the meaning of user speech and to determine how to respond to the user speech. The dialog management component 1268 may define rules and behaviors relating to different information or topic domains, such as news, traffic, weather, to-do lists, shopping lists, music, home automation, retail services, and so forth. The domain logic maps spoken user statements to respective domains and is responsible for determining dialog responses and/or actions to perform in response to user utterances.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method, comprising:
   receiving, from a first device, first data representing a device identifier and a first device type associated with devices that are provisioned by the first device;
   generating a first message representing a first certificate signing request that includes the first device type and the device identifier;
   sending the first message;
   receiving second data representing a first certificate chain including at least the first certificate signing request signed using first encryption data;
   receiving third data representing a product device type indicating one or more capabilities of a second device, the product device type differing from the first device type;
   generating a second message representing a second certificate signing request that includes the product device type and the device identifier;
   sending the second message; and
   receiving fourth data representing a second certificate chain including at least the second certificate signing request signed using second encryption data.

2. The method of claim 1, further comprising receiving fifth data representing a serial number, and wherein:
   generating the first message further includes generating the first message to include the serial number; and
   generating the second message further includes generating the second message to include the serial number.

3. The method of claim 1, further comprising:
   storing the second data at a first location in a memory;
   storing the fourth data at a second location in the memory, the second location differing from the first location.

4. The method of claim 1, further comprising:
   receiving an instruction to verify the first encryption data;
   based at least in part on the instruction, generating a third message encrypted utilizing the first encryption data;
   decrypting the third message using public encryption data; and
   verifying the first encryption data based at least in part on the third message.

5. The method of claim 1, further comprising:
   sending, to a remote system, audio data representing speech;
   receiving, from the remote system, sixth data representing an instruction associated with the one or more capabilities; and
   causing the one or more capabilities to be performed.

6. The method of claim 1, further comprising:
   receiving audio data representing speech;
   determining an instruction associated with the one or more capabilities based at least in part on the audio data; and
   causing the one or more capabilities to be performed.

7. The method of claim 1, further comprising:
   receiving a command to verify the third data;
   determining that the first message represents the first device type and the device identifier; and
   verifying the second data based at least in part on the first message representing the first device type and the device identifier.

8. The method of claim 1, wherein:
   the first certificate chain further includes a product certificate and a manufacturer certificate; and
   the second certificate chain further includes the product certificate and the manufacturer certificate.

9. The method of claim 1, further comprising:
   storing fifth data representing a media-access-control (MAC) address associated with a first network interface of a network interface associated with the first device; and
   storing sixth data representing a second MAC address associated with a second network interface of the second device.

10. The method of claim 1, further comprising identifying a provisioning computing resource based at least in part on the product device type.

11. A system, comprising:
    one or more processors; and
    non-transitory computer-readable media storing instructions that, when executed by the one or more processors, cause the one or more processors to perform operations comprising:
    receiving, from a first device, first data representing a first device type, the first device type being associated with devices that are provisioned by the first device;
    receiving second data representing a device identifier;
    generating a first message representing a first certificate signing request that includes the first device type and the device identifier;
    sending the first message;
    receiving third data representing a first certificate chain including at least the first certificate signing request signed using first encryption data;
    receiving fourth data representing a product device type indicating one or more capabilities of a second device, the product device type being different than the first device type;
    generating a second message representing a second certificate signing request that includes the product device type and the device identifier;
    sending the second message; and
    receiving fifth data representing a second certificate chain including at least the second certificate signing request signed using second encryption data.

12. The system of claim 11, the operations further comprising receiving sixth data representing a serial number, and wherein:

generating the first message further includes generating the first message to include the serial number; and
generating the second message further includes generating the second message to include the serial number.

13. The system of claim 11, the operations further comprising:
storing the third data at a first location in a memory;
storing the fifth data at a second location in the memory, the second location being different than the first location.

14. The system of claim 11, the operations further comprising:
receiving an instruction to verify the first encryption data;
based at least in part on the instruction, generating a third message encrypted utilizing the first encryption data;
decrypting the third message using public encryption data; and
verifying the first encryption data based at least in part on the third message.

15. The system of claim 11, the operations further comprising:
sending, to a remote system, audio data representing speech;
receiving, from the remote system, sixth data representing an instruction associated with the one or more capabilities; and
causing the one or more capabilities to be performed.

16. The system of claim 11, the operations further comprising:
receiving audio data representing speech;
determining an instruction associated with the one or more capabilities based at least in part on the audio data; and
causing the one or more capabilities to be performed.

17. The system of claim 11, the operations further comprising:
receiving a command to verify the third data;
determining that the first message represents the first device type and the device identifier; and
verifying the third data based at least in part on the first message representing the first device type and the device identifier.

18. The system of claim 11, wherein:
the first certificate chain further includes a product certificate and a manufacturer certificate; and
the second certificate chain further includes the product certificate and the manufacturer certificate.

19. The system of claim 11, the operations further comprising:
storing sixth data representing a media-access-control (MAC) address associated with a first network interface of a network interface associated with the first device; and
storing seventh data representing a second MAC address associated with a second network interface of the second device.

20. The system of claim 11, the operations further comprising identifying a provisioning computing resource based at least in part on the product device type.

* * * * *